(12) United States Patent
Mizutani et al.

(10) Patent No.: US 12,372,544 B2
(45) Date of Patent: Jul. 29, 2025

(54) CLINICAL ANALYZER AUTOMATED SYSTEM FAULT DIAGNOSTIC METHODS

(71) Applicant: Beckman Coulter, Inc., Brea, CA (US)

(72) Inventors: Takayuki Mizutani, Edina, MN (US); Kiyotaka Kubota, Akishima (JP); Carl Erickson, Waconia, MN (US); Scott Maik, Brooklyn Center, MN (US); Nicole Sovde, Eden Prairie, MN (US)

(73) Assignee: Beckman Coulter, Inc., Brea, CA (US)

( * ) Notice: Subject to any disclaimer, the term of this patent is extended or adjusted under 35 U.S.C. 154(b) by 873 days.

(21) Appl. No.: 17/358,366

(22) Filed: Jun. 25, 2021

(65) Prior Publication Data

US 2021/0396774 A1    Dec. 23, 2021

Related U.S. Application Data

(63) Continuation of application No. PCT/US2019/068650, filed on Dec. 27, 2019.

(60) Provisional application No. 62/785,863, filed on Dec. 28, 2018.

(51) Int. Cl.
*G01N 35/00* (2006.01)
*G01N 21/76* (2006.01)
*G01N 35/10* (2006.01)

(52) U.S. Cl.
CPC . *G01N 35/00623* (2013.01); *G01N 35/00712* (2013.01); *G01N 35/1016* (2013.01); *G01N 21/76* (2013.01); *G01N 2035/00653* (2013.01); *G01N 2035/1025* (2013.01)

(58) Field of Classification Search
CPC ....... G01N 35/00623; G01N 35/00712; G01N 35/1016; G01N 21/76; G01N 2035/00653; G01N 2035/1025
USPC .......... 422/63–67; 436/43–55, 172
See application file for complete search history.

(56) References Cited

U.S. PATENT DOCUMENTS

| | | | |
|---|---|---|---|
| 6,055,060 A | 4/2000 | Bolduan et al. | |
| 6,080,364 A | 6/2000 | Mimura et al. | |
| 6,416,969 B2 | 7/2002 | Matsumura et al. | |
| 6,456,944 B1 * | 9/2002 | Burkhardt .......... | G01N 35/1016 73/864.22 |

(Continued)

FOREIGN PATENT DOCUMENTS

| | | |
|---|---|---|
| CN | 101688842 A | 3/2010 |
| CN | 104471384 A | 3/2015 |

(Continued)

OTHER PUBLICATIONS

International Search Report and Written Opinion dated May 1, 2020 for Application No. PCT/US2019/068650, 9 pgs.

(Continued)

*Primary Examiner* — Arlen Soderquist
(74) *Attorney, Agent, or Firm* — FROST BROWN TODD LLP

(57) ABSTRACT

A method for operating and diagnosing faults in a laboratory instrument comprising a plurality of subsystems may comprise performing an analytic sequence and a set of diagnostic steps. Such a method may be performed using a diagnostic reagent comprising paramagnetic particles and lacking an antibody component. Such a method may also include evaluating a set of the instrument's subsystems in the opposite of the order in which those subsystems are used during analysis.

17 Claims, 11 Drawing Sheets

(56) References Cited

U.S. PATENT DOCUMENTS

| | | |
|---|---|---|
| 6,579,717 B1 | 6/2003 | Matsubara et al. |
| 6,599,749 B1 | 7/2003 | Kodama et al. |
| 6,846,457 B1 | 1/2005 | Tokiwa et al. |
| 7,661,013 B2 | 2/2010 | Berman et al. |
| 8,055,475 B1 | 11/2011 | Hooper |
| 8,065,113 B2 | 11/2011 | Okuno et al. |
| 8,069,239 B2 | 11/2011 | Trochman |
| 8,313,695 B2 | 11/2012 | Akutsu |
| 8,555,114 B2 | 10/2013 | Beebe |
| 8,600,689 B2 | 12/2013 | Orihashi et al. |
| 8,635,047 B2 | 1/2014 | Desjobert et al. |
| 8,938,409 B2 | 1/2015 | Parvin et al. |
| 9,140,693 B2 | 9/2015 | Ewart et al. |
| 9,176,154 B2 | 11/2015 | Darmstadt et al. |
| 9,229,015 B2 | 1/2016 | Li et al. |
| 9,377,475 B2 | 6/2016 | Emeric et al. |
| 9,383,376 B2 | 7/2016 | Kamihara et al. |
| 9,488,585 B2 | 11/2016 | Emeric et al. |
| 9,494,610 B2 | 11/2016 | Yamamoto et al. |
| 9,778,274 B2 | 10/2017 | Shiba et al. |
| 9,787,815 B2 | 10/2017 | Erickson et al. |
| 9,810,658 B2 | 11/2017 | Crooks et al. |
| 9,810,703 B2 | 11/2017 | Darmstadt et al. |
| 9,885,193 B2 | 2/2018 | Chen et al. |
| 10,049,013 B2 | 8/2018 | Gabel et al. |
| 2002/0064881 A1 | 5/2002 | Devlin et al. |
| 2002/0064884 A1 | 5/2002 | Devlin, Sr. et al. |
| 2002/0166082 A1 | 11/2002 | Ramadei et al. |
| 2003/0049171 A1 | 3/2003 | Tamura et al. |
| 2004/0101440 A1* | 5/2004 | Ishizawa ............ G01N 35/1009 422/64 |
| 2004/0175840 A1 | 9/2004 | Devlin, Sr. et al. |
| 2005/0013736 A1* | 1/2005 | McKeever ............ G01N 35/025 422/65 |
| 2005/0196867 A1* | 9/2005 | Bower ............ G01N 35/00603 436/43 |
| 2005/0249634 A1 | 11/2005 | Devlin, Sr. |
| 2006/0047363 A1 | 3/2006 | Farrelly et al. |
| 2007/0105214 A1 | 5/2007 | Micklash, II et al. |
| 2007/0183926 A1 | 8/2007 | Tanoshima |
| 2008/0056944 A1 | 3/2008 | Nakamura et al. |
| 2008/0193332 A1* | 8/2008 | Talmer ................ G01N 35/04 422/63 |
| 2008/0219887 A1 | 9/2008 | Akutsu |
| 2009/0082984 A1* | 3/2009 | Wakamiya .......... G06F 11/0769 702/85 |
| 2009/0114255 A1* | 5/2009 | Kato ................ B01L 13/02 134/56 R |
| 2009/0215183 A1* | 8/2009 | Takehara ........ G01N 35/00623 422/67 |
| 2009/0257051 A1* | 10/2009 | Kubota ............ G01N 35/00623 356/237.1 |
| 2009/0258433 A1* | 10/2009 | Kubota ............ G01N 35/00623 436/164 |
| 2009/0269242 A1 | 10/2009 | Nozawa |
| 2009/0292492 A1* | 11/2009 | Nishida ............ G01N 35/00623 702/85 |
| 2010/0098589 A1 | 4/2010 | Kubota |
| 2010/0247379 A1* | 9/2010 | Schmidt ................ G05D 21/02 422/77 |
| 2011/0236981 A1* | 9/2011 | Wakamiya ......... G01N 35/1011 422/69 |
| 2011/0269239 A1* | 11/2011 | Diessel ............... G01N 35/028 422/63 |
| 2013/0034466 A1* | 2/2013 | Wakamiya ......... G01N 35/0092 422/63 |
| 2013/0039809 A1 | 2/2013 | Akutsu |
| 2013/0078625 A1 | 3/2013 | Holmes et al. |
| 2013/0189798 A1* | 7/2013 | Donnerbauer ..... G01N 21/6428 436/501 |
| 2014/0271369 A1 | 9/2014 | Fritchie |
| 2015/0226759 A1 | 8/2015 | Connolly et al. |
| 2016/0084861 A1 | 3/2016 | Kleider et al. |
| 2016/0091519 A1* | 3/2016 | Ohfuchi ................ B25J 9/1679 422/67 |
| 2016/0245690 A1 | 8/2016 | Nammoku et al. |
| 2017/0059598 A1 | 3/2017 | Yamamoto et al. |
| 2017/0212137 A1* | 7/2017 | Sasaki ................. G01N 35/025 |
| 2017/0285624 A1 | 10/2017 | Lesher |
| 2018/0031589 A1* | 2/2018 | Tamezane .......... G01N 35/1016 |
| 2018/0128741 A1 | 5/2018 | Kamihara et al. |
| 2018/0361379 A1 | 12/2018 | Biro et al. |

FOREIGN PATENT DOCUMENTS

| | | |
|---|---|---|
| CN | 105264374 A | 1/2016 |
| EP | 2072999 | 6/2009 |
| EP | 2077446 | 7/2009 |
| EP | 2 175 259 A1 | 4/2010 |
| EP | 2 743 704 A2 | 6/2014 |
| EP | 2 516 669 B1 | 10/2016 |
| IN | 279743 B | 2/2017 |
| JP | H10-339732 A | 12/1998 |
| JP | 2003-057248 A | 2/2003 |
| JP | 2004-194141 A | 7/2004 |
| JP | 2004-347385 A | 12/2004 |
| JP | 3 840 450 B2 | 11/2006 |
| JP | 2007-108136 A | 4/2007 |
| JP | 2007-514954 | 6/2007 |
| JP | 4058081 B2 | 3/2008 |
| JP | 2008-224439 | 9/2008 |
| JP | 4217237 B2 | 1/2009 |
| JP | 4436853 B2 | 3/2010 |
| JP | 4491505 B2 | 6/2010 |
| JP | 2009-074887 | 10/2010 |
| JP | 2011-149747 A | 8/2011 |
| JP | 2012-008077 | 1/2012 |
| JP | 4969292 B2 | 7/2012 |
| JP | 2012-163576 A | 8/2012 |
| JP | 2014-193114 | 10/2014 |
| JP | 5912320 B2 | 4/2016 |
| WO | WO 2005/066604 | 7/2005 |
| WO | WO 2008/044313 | 2/2010 |
| WO | WO 2011/011075 A2 | 1/2011 |
| WO | WO 2015/029595 | 3/2017 |
| WO | WO 2018/081617 | 5/2018 |
| ZA | 201404472 B | 11/2015 |

OTHER PUBLICATIONS

European Search Report and Opinion for EP 23198468 dated May 14, 2024, 19 pages.

Extended European Search Report dated Feb. 8, 2023 for Application No. 19903480.2, 16 pgs.

* cited by examiner

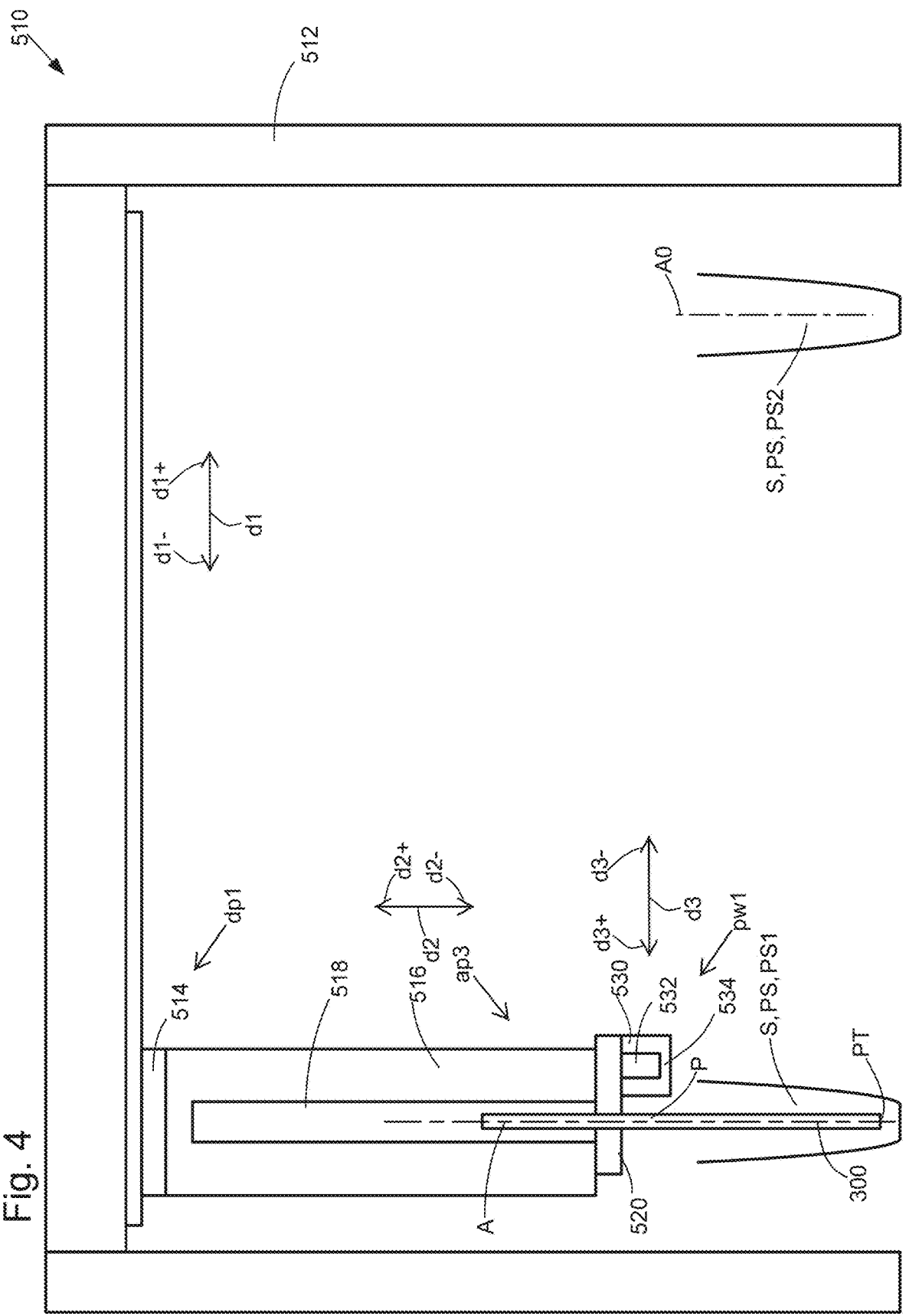

CLINICAL ANALYZER AUTOMATED SYSTEM FAULT DIAGNOSTIC METHODS

RELATED APPLICATIONS

This application is a continuation of International Application Number PCT/US19/68650, titled "Clinical Analyzer Automated System Diagnostics" filed in the United States Patent Office on Dec. 27, 2019, which is related to, and claims the benefit of, provisional patent application 62/785,863, titled "Clinical Analyzer Automated System Diagnostics" filed in the United States Patent Office on Dec. 28, 2018. Those applications are hereby incorporated by reference in their entirety.

BACKGROUND

Automated clinical analyzers are well known in the art and are generally used for the automated or semi-automated analysis of patient samples. Typically, prepared patient samples, such as blood, urine, spinal fluid, and the like are placed onto such an analyzer in sample containers such a test tubes. The analyzer pipettes a patient sample and one or more reagents to a reaction cell (e.g., a reaction vessel, cuvette or flow cell) where an analysis of the sample is conducted, usually for a particular analyte of interest, and results of the analysis are reported.

Historically, maintaining such analyzers generally requires customers, field service and manufacturing engineers to manually run diagnostic routines that involve manually filling sample tubes with test solutions, loading them into an analyzer, requesting tests on the tubes using the analyzers user interface, and processing them through the instrument. During this process the analyzer may be rendered unavailable for processing of actual samples, which can result in significant downtime over the life of the machine. Additionally, if there is a fault in a machine, the individual responsible for fixing it (e.g., a field service engineer) may not have any information regarding the root cause of the fault, and therefore may be required to begin any work with an extended period of diagnostic testing simply to determine what type of remediation may be required, thereby further increasing the instrument's downtime.

Thus, there is a need for a method of diagnosing faults in clinical analyzers that overcomes the limitations of the prior art.

SUMMARY

According to certain aspects of the present disclosure, a method of operating and diagnosing faults in a laboratory instrument comprising a plurality of subsystems could be implemented. Such a method may comprise performing an analytic sequence of steps to analyze a biological sample, wherein the analytic sequence of steps may utilize a set of subsystems from the plurality of subsystems in a first order. Such a method may also comprise performing a set of diagnostic steps to identify faults in the laboratory instrument. In such a case, performing the set of diagnostic steps may comprise evaluating each subsystem in the set of subsystems in a second order, and the second order in which the subsystems from the set of subsystems are evaluated may reverse the first order in which the set of subsystems are used in the analytic sequence of steps.

According to certain aspects of the present disclosure, a method of operating and diagnosing fault in a laboratory instrument may be implemented that comprises performing an analytic sequence of steps and a diagnostic sequence of steps. In such a method the analytic sequence of steps may comprise adding, to a reaction vessel, an assay reagent comprising paramagnetic particles and an antibody adapted to bind to an analyte. The set of diagnostic steps may comprise, for each vessel in a set of vessels, adding a diagnostic reagent that comprises paramagnetic particles and does not include an antibody component.

According to certain aspects of the present disclosure, a method of diagnosing faults in a laboratory instrument may be implemented. Such a method may comprise washing each vessel from a set of vessels, using a digital camera to capture one or more particle retention images, and calculating a retention value based on the one or more particle retention images.

According to certain aspects of the present disclosure, a method of diagnosing faults in a laboratory instrument comprising a plurality of subsystems may be implemented. Such a method may comprise performing a set of diagnostic steps to identify faults in the laboratory instrument. In such a method, each diagnostic step from the set of diagnostic steps may correspond to a subsystem from the plurality of subsystems. Such a method may also comprise detecting a fault in the laboratory instrument during performance of a diagnostic step from the set of diagnostic step, and providing an output identifying the subsystem corresponding to the diagnostic step during which the fault in the laboratory instrument was detected.

According to certain aspects of the present disclosure, a method of operating and diagnosing faults in a laboratory instrument may be implemented. In some aspects, such a method may comprise performing an analytic sequence of steps to analyze a biological sample. Such an analytic sequence of steps may comprise transferring a portion of the biological sample from a sample vessel to a reaction vessel, creating an analytic mixture by transferring a first reagent comprising alkaline phosphatase (ALP) from a reagent pack to the reaction vessel, removing portions of the analytic mixture that are not bound to an analyte from the reaction vessel using a assay washing subsystem, and adding a substrate adapted to generate chemiluminescent light in reaction with ALP to the reaction vessel and detecting chemiluminescent light generated by the substrate in reaction with the ALP using a luminometer. In such a method, the method may also comprise performing a set of diagnostic steps that comprises evaluating the assay washing subsystem by, for each of a set of one or more vessels, performing a set of wash efficiency check steps. Such wash efficiency check steps may comprise, for each of the vessels, adding a combination of ALP solution, a second reagent comprising paramagnetic particles, and a wash buffer to that vessel. Such wash efficiency check steps may also comprise, for each of the vessels, performing a set of washing steps comprising subjecting that vessel to a magnetic field, adding additional wash buffer to that vessel, and spinning the contents of that vessel. Such wash efficiency check steps may also comprise, for each of the vessels, aspirating fluid from that vessel, adding the substrate adapted to generate chemiluminescent light in reaction with ALP to that vessel, and using the luminometer to measure chemiluminescent light from that vessel after it has been placed in a luminometer vessel chamber.

According to certain aspects of this disclosure a method of operating and diagnosing faults in a laboratory instrument could be implemented. Such a method may comprise performing an analytic sequence of steps to analyze a biological sample that utilizes a plurality of subsystems comprising a sample dispensing subsystem, a reagent dispensing subsystem, an assay washing subsystem, and a chemiluminescence detection subsystem. In such a method, the analytic sequence of steps may comprise creating an analytic mixture by transferring a first reagent comprising ALP from a reagent pack to the reaction vessel using the reagent dispensing subsystem, removing portions of the analytic mixture that are not bound to an analyte from the reaction vessel using the assay washing subsystem, and adding a substrate adapted to generate chemiluminescent light in reaction with ALP to the reaction vessel and detecting chemiluminescent light generated by substrate in reaction with the ALP using the chemiluminescence detection subsystem. Such a method may also comprise performing a set of diagnostic steps that comprises evaluating the plurality of subsystems using a luminometer comprised by the chemiluminescence detection subsystem, and, in parallel with this evaluation, using machine vision to evaluate one or more subsystems from the plurality of subsystems.

According to certain aspects of this disclosure a method of operating and diagnosing faults in a laboratory instrument comprising a plurality of subsystems could be implemented. Such a method may comprise performing an analytic sequence of steps and a diagnostic sequence of steps. In such a method, the analytic sequence of steps may comprise transferring a portion of a biological sample from a sample vessel to a reaction vessel, creating an analytic mixture by transferring a first reagent comprising ALP from a reagent pack to the reaction vessel using a reagent dispensing subsystem, removing portions of the analytic mixture that are not bound to an analyte from the reaction vessel using an assay washing subsystem, and adding a substrate adapted to generate chemiluminescent light in reaction with ALP to the reaction vessel and detecting chemiluminescent light generated by substrate in reaction with the ALP using a chemiluminescence detection subsystem. In such a method, the set of diagnostic steps may comprise adding the substrate to a testing vessel, and, based on chemiluminescent light detected using the chemiluminescence detection subsystem, determining that a fault exists in the laboratory instrument. Such a method may also comprise, based on determining that the fault exists in the laboratory instrument, performing a set of extended diagnostic steps. Such a set of extended diagnostic steps may comprise, for each of a plurality of extended testing vessels, adding a predetermined volume of testing fluid to that extended testing vessel, capturing an image of that extended testing vessel, and determining volume of the testing fluid in that extended testing vessel using the image of that extended testing vessel. In such a method the testing fluid may be selected from a group consisting of the substrate adapted to generate chemiluminescent light in reaction with ALP, wash buffer, the first reaction comprising ALP, and a second reagent comprising paramagnetic particles.

According to certain aspects of this disclosure a non-transitory computer readable media having stored thereon data operable to configure a computer to perform methods such as described in any of the preceding paragraphs could be implemented.

According to certain aspects of this disclosure a machine comprising a sample dispensing subsystem, a reagent dispensing subsystem, an assay washing subsystem, a chemiluminescence detection subsystem, and a means for automatically diagnosing faults in the operation of the machine could be implemented.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 4 illustrates an example pipetting system.

DETAILED DESCRIPTION

Figure 1:
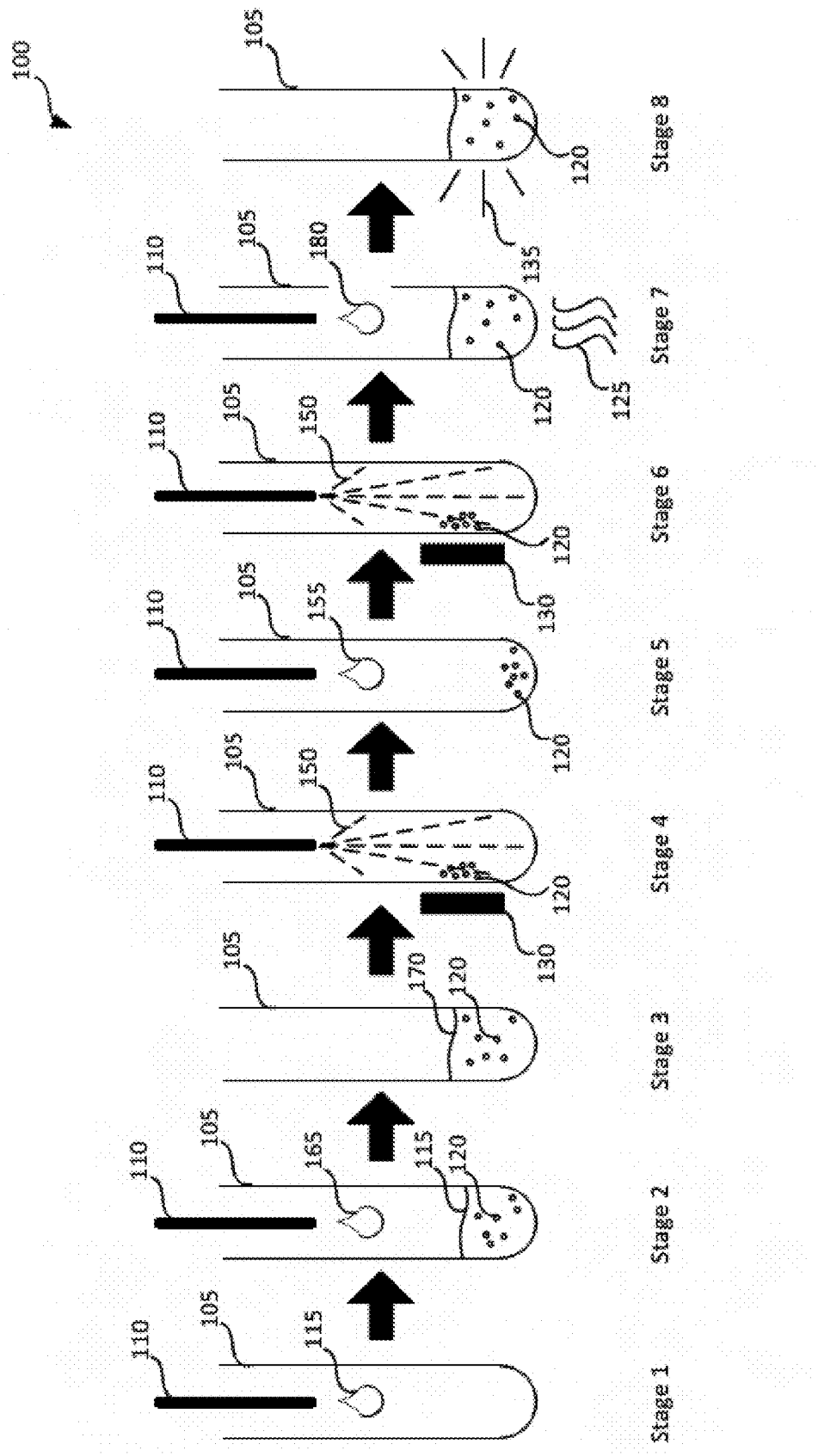
FIG. 1 illustrates an example assay.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Turning now to FIG. 1, that figure illustrates an example assay 100 such as may be performed by an automated clinical analyzer. The assay 100 begins at stage 1. Reaction vessel 105 (e.g., cuvette) can be used for the assay 100. A pipette 110 is used to place a first reagent 115 including iron particles 120 at a concentration of between 0.3 to 2.0 mg/mL into the reaction vessel 105. The first reagent 115 will also include antibodies or antigens that are tailored to bond only with an analyte in a patient sample 165 that the assay is meant to measure. In assay 100, the iron particles 120 are coated with the antibodies or antigens.

At stage 2, the patient sample 165 is added to the reaction vessel 105 with pipette 110. Pipette 110 may be cleaned, new, or have a new tip at each stage. Additionally, for some analyzers different pipettes may be used in different stages (e.g., a first pipette for dispensing of the patient sample, a second pipette for dispensing of the reagent, a third pipette for aspiration and/or washing, etc.).

At stage 3, the reaction vessel 105, containing the patient sample 165 and the first reagent 115 (including the iron particles 120) is mixed to create a mixture 170. Additionally (or alternatively), in some analyzers, the contents of the vessel 105 may be subjected to a heat source (i.e., incubation) as well as, or instead of, being mixed. During a binding process, the antibodies or antigens on the iron particles 120 of the first reagent 115 bind with the analyte of interest in the patient sample 165. The binding process can result in the analyte of the patient sample 165 binding with the antigens or antibodies that are coated on the iron particles 120.

At stage 4, the reaction vessel 105 is moved near one or more magnets 130, which attracts the iron particles 120 to one or more sides (e.g., perimeter portions) of the reaction vessel 105. Pipette 110 is used to wash the reaction vessel 105 with a washing agent 150. While washing, the magnet(s) 130 retain the iron particles 120 at the one or more sides of the reaction vessel 105. The iron particles 120 and the bound analyte of the patient sample 165 remain in the reaction vessel 105 after the washing is complete by virtue of the magnet(s) 130. Other components of the patient sample 165 may be absent from the reaction vessel 105 after the washing is complete, having been washed away by the washing agent 150.

At stage 5, a second reagent 155, including alkaline phosphatase ("ALP") (generally at a concentration of between 0.01 mg/L and 2.0 mg/L), can be placed in the reaction vessel 105 with the iron particles 120 and the bound analyte of the patient sample 165 using pipette 110. The second reagent 155 and the iron particles 120 can be mixed and/or incubated. The second reagent 155 can include an antibody attached to the ALP that binds with the analyte of the patient sample 165, still attached to the iron particles 120.

At stage 6 the magnet(s) 130 pull the iron particles 120 to one or more sides of the reaction vessel 105. The iron particles 120 now have the bound analyte of the patient sample 165 and the ALP of the second reagent 155 bound to them. Unbound portions of the second reagent 155 are rinsed away with additional washing agent 150 added with pipette 110 to reaction vessel 105, unbound fluid can be aspirated from the reaction vessel 105.

At stage 7, a substrate material 180 is added to the reaction vessel 105 with pipette 110. The substrate material 180 is mixed and incubated using a heat source 125 (e.g., the reaction vessel 105 is placed in an incubator). The substrate material 180 reacts with the ALP enzyme and thereby produces light 135 (i.e., photons).

At stage 8, the light 135, emitted by the reaction of the substrate material 180 and the ALP attached to the iron particles 120, can be measured using a luminometer such as discussed below in the context of FIG. 2 to generate an output signal that can be processed to generate a relative light unit ("RLU") value (i.e., an output response) indicating a result of the assay 100. For example, a larger RLU value indicates more light, which indicates a larger amount of the analyte in the patient sample 165 than a smaller RLU value indicates.

Figure 2A:
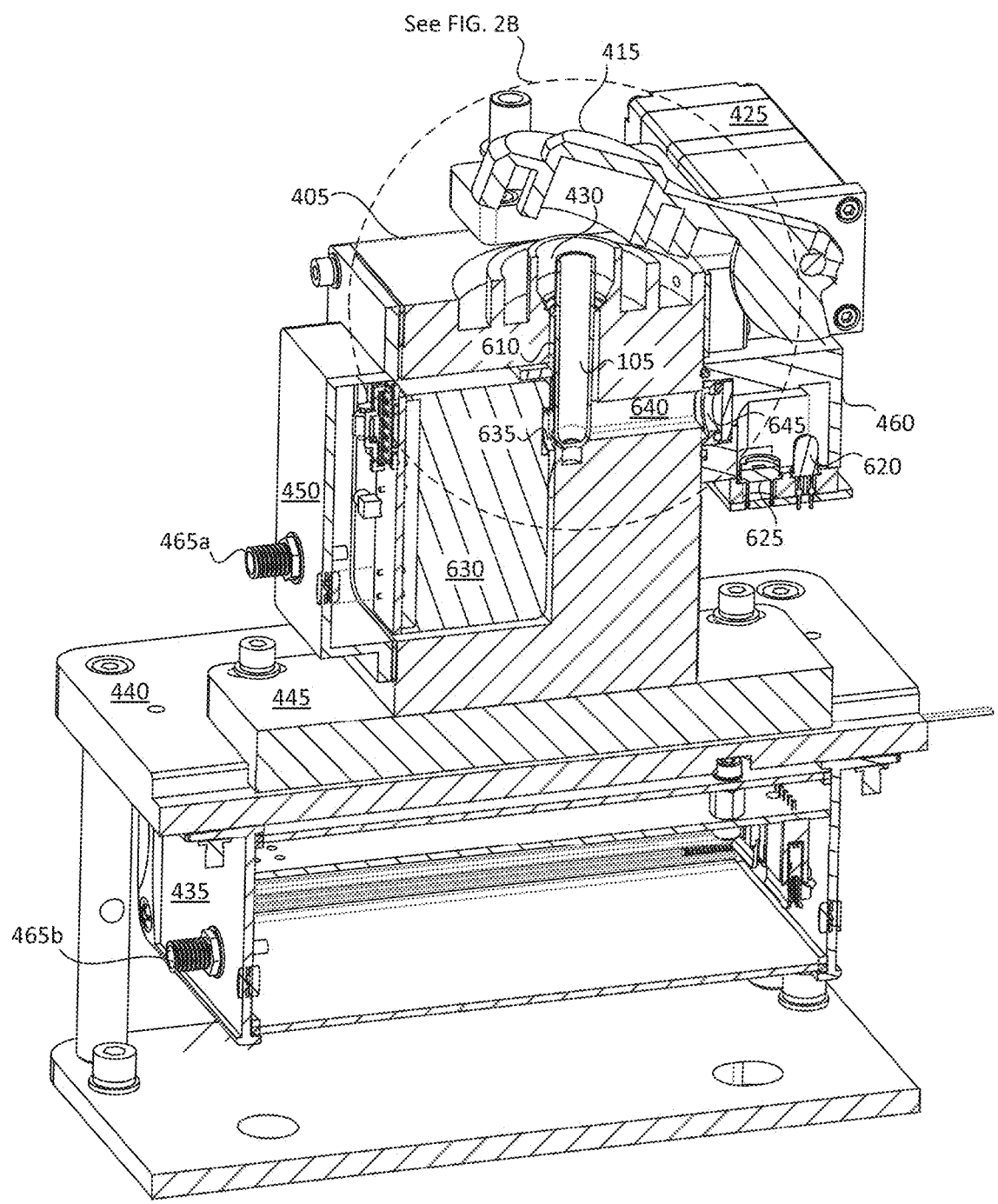
FIGS. 2A-2B illustrate a cross sectional perspective view of a luminometer.
Figure 2B:
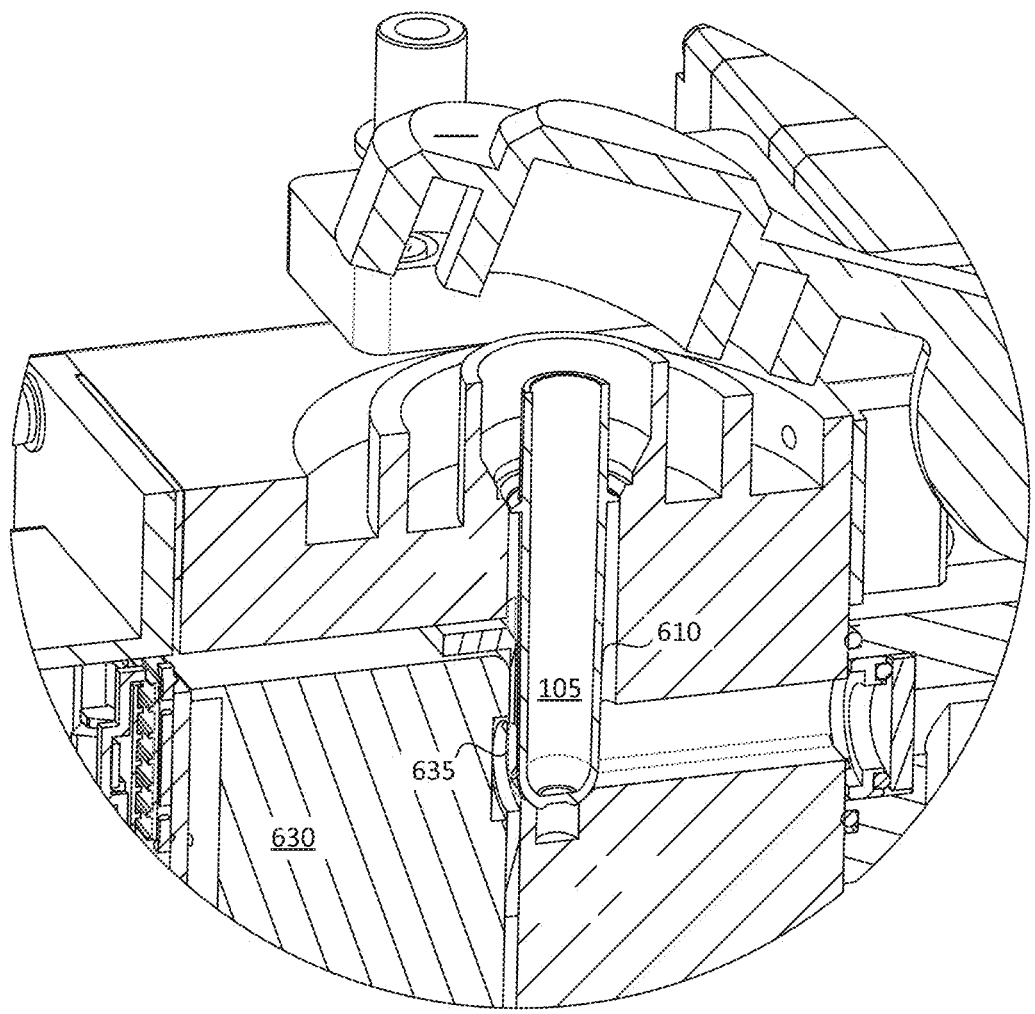

Turning now to FIGS. 2A and 2B, FIG. 2A illustrates a cross-sectional perspective view of a luminometer for performing the assay 100, and FIG. 2B provides an enlarged view of a portion of FIG. 2A, as shown by the dashed circle in FIG. 2A. The cut portions of the cross-sectional perspective view are shown by cross-hatching. The cross-sectional perspective view illustrates the cap 415, the chassis 405, the luminometer computer system compartment 435, the PMT cover 450, the stand 440, the motor 425, the thermal barrier 445, the reaction vessel chamber 610, and the calibration unit 460. Also shown is the luminometer output signal socket 465a and the luminometer output signal socket 465b.

FIG. 2A provides a view of the chamber opening 430, which provides access to reaction vessel chamber 610. Reaction vessel 105 is shown seated within reaction vessel chamber 610. Light passage 640 intersects with reaction vessel chamber 610 near the bottom of the reaction vessel chamber 610. The PMT 630 can be a photomultiplier tube or any other suitable light detecting device or light detector. The PMT 630 can include a sensing element (not shown in detail) that detects light from light passage 640 and/or reaction vessel chamber 610. The PMT 630 is adjacent an aperture 635 that is aligned with the light passage 640 and past an intersection of the light passage 640 and the reaction vessel chamber 610. The aperture 635 allows light to enter the PMT 630 and the sensing element to receive the light. The reaction vessel chamber 610 intersects with the light passage 640 such that when the reaction vessel 105 is placed in the reaction vessel chamber 610, the substance or sample within the reaction vessel 105 can emit photons viewable in the light passage 640 and to the aperture 635. The aperture 635 can be limited in size, for example to 8.5 centimeters in diameter, to limit the view of a meniscus within the reaction vessel 105. On the other end of the light passage 640, the calibration unit aperture 645 can align with the light passage 640. The calibration unit 460 can include a light emitting diode ("LED") 620 and a photodiode 625. The LED 620 and photodiode 625 can provide a regulated internal light source used to calibrate PMT 630. The reaction vessel 105 is not needed in the luminometer, for example during calibration. While the luminometer is described as including the reaction vessel 105, this is an optional component of the system that may not necessarily be part of the luminometer.

Figure 3A:
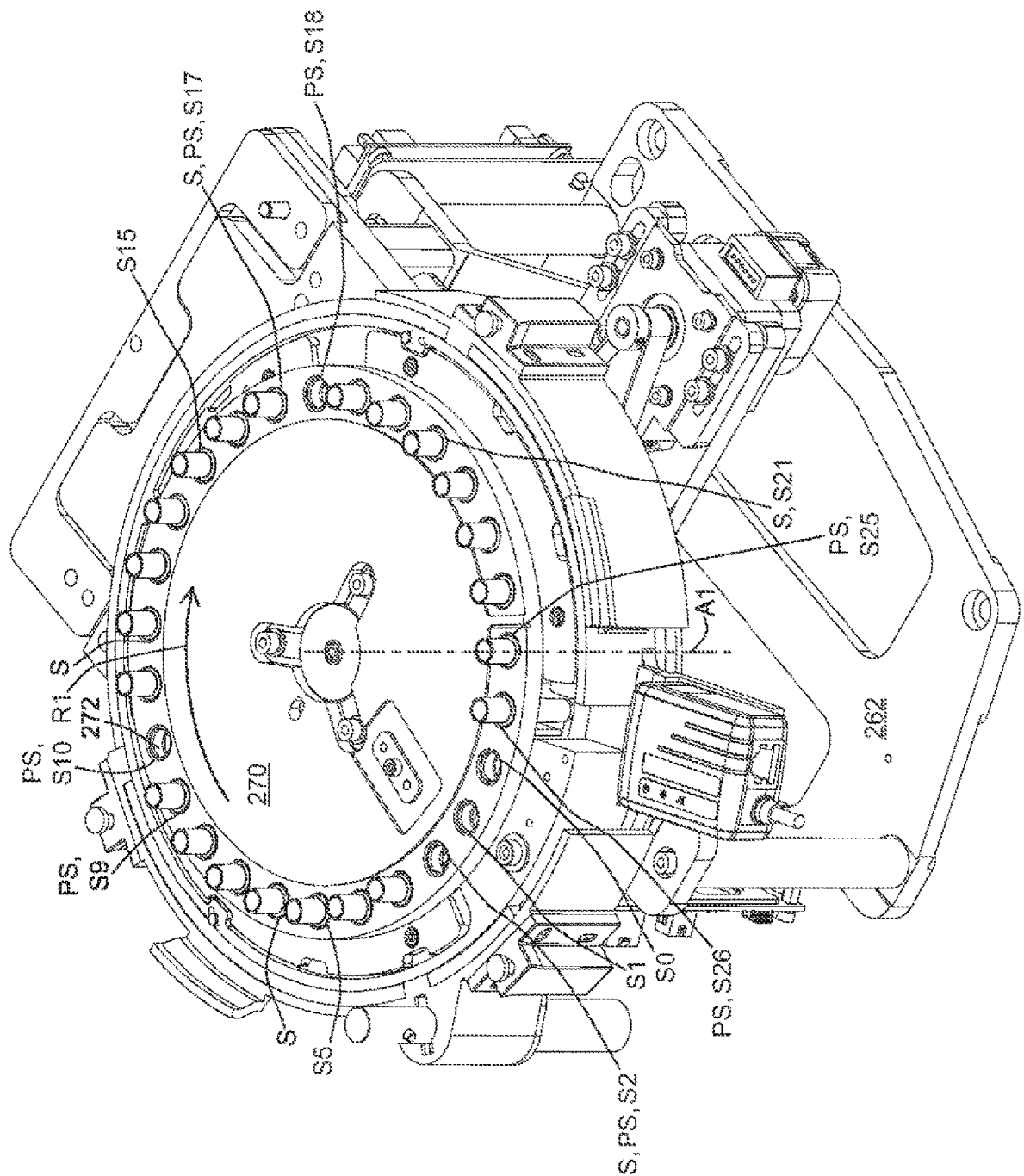
FIGS. 3A-3B illustrate an exemplary wash wheel.
Figure 3B:
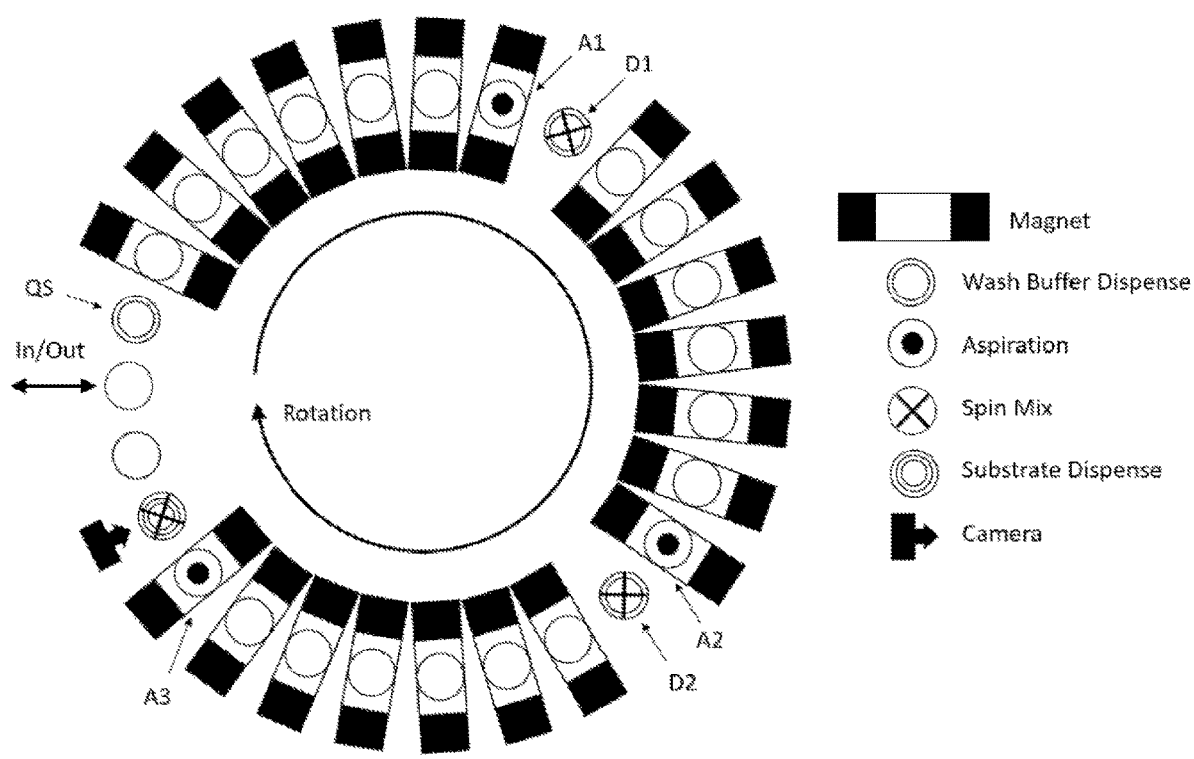

Turning now to FIGS. 3A-3B, those figures illustrate a wash wheel 270 that can be used in performing an assay 100 as shown in FIG. 1. The wash wheel 270 includes a plurality of holders 272 (e.g., holes, etc.). As depicted, the wash wheel 270 includes 27 holders 272. In other embodiments, the wash wheel 270 may include less than or more than 27 holders 272. The holders 272 are each configured to receive a vessel 105 (e.g., a reaction vessel) and the vessel 105 and holder 272 it had received would be axisymmetric and are axisymmetric with each other, when mated.

In the example of FIGS. 3A-3B, 27 stations S attached to the frame 262 of the clinical analyzer are defined, about which the wash wheel 270 moves the holders 272. In particular, the wash wheel 270 rotates about an axis A1 and thereby moves the holders 272 from station to station about a rotational displacement R1. In the illustrative wash wheel 270 of FIGS. 3A-3B, the wash wheel 270 is indexed 13⅓ degrees per cycle and thereby advances each of the 27 holders 272 one station forward per cycle.

In FIG. 3A, the stations S are labeled with respect to the wash wheel 270 at a given position, with individual stations being designated using the letter "S" followed by a station number. Not all stations S are labeled, but can be determined by counting between the labeled stations S. In FIG. 3B, the station designations using the letter "S" followed by a station number are omitted. However, correspondence between the figures can be established by mapping the in/out station in FIG. 3B to station S1 in FIG. 3A, and mapping the station labeled QS in FIG. 3B to station S2 in FIG. 3A. Descriptions of the various stations and roles they can play in an assay 100 as shown in FIG. 1 are set forth below.

In some clinical analyzers, station S0 may be a no-function station, but may transfer a vessel 105 between neighboring stations. Station S1 is an entrance/exit station. The vessel 105 is introduced to one of the holders 272 of the wash wheel 270 at station S1. This may be done, for example, after the first reagent 115 (stage 1) and sample 165 (stage 2) have been added to the reaction vessel (e.g., in a reaction build carriage, not pictured in FIGS. 3A-3B), and then the contents of the vessel have been mixed or incubated (stage 3) (e.g., in an incubation wheel, also not shown in FIGS. 3A-3B). From station S1, the vessel 105 is rotated to the other stations S and eventually returns to the station S1 where it is removed from the holder 272 of the wash wheel 270.

After a vessel 105 has been added to the wash wheel 270 at station S1, it will be rotated to station S2, where a wash fluid 150 is dispensed (beginning of stage 4). The contents of the vessel 105 will then be rotated through stations S3-S8 where the paramagnetic particles 120 in the reaction vessel will be drawn to the side of the vessel. It will then be rotated to station S9 (labeled as station A1 in FIG. 3B) where the contents of the vessel that are not bound to a paramagnetic particle that is attracted to the side of the vessel by a magnet will be aspirated. The vessel will then be moved to station S10 (labeled as D1 in FIG. 3B) where wash buffer will be added to it and the contents of the vessel will be spin mixed. This may then be repeated for stations S11-S18 (i.e., the vessel could be magnetized in positions S11-S16, have its contents aspirated in position S17/A2, then have additional buffer added and be mixed in position S18/D2). The vessel could then be subjected to another magnetization/aspiration procedure in positions S19-S25, at which point stage 4 of the assay 100 could be treated as complete.

After stage 4, the vessel could be moved to position S1, from which it could be removed using a pick and place device to a reaction build carriage for dispensing of the second reagent 155 (stage 5). At this point, it could then be returned to the wash wheel for an additional magnetization+ aspiration cycle (i.e., stage 6), either directly or after being subjected to additional mixing and/or incubation (e.g., in an incubation wheel). In general, the additional magnetization+ aspiration cycle of stage 6 would be performed in the same manner as described above for stage 4 (i.e., wash buffer would be dispensed at positions QS, D1 and D2, the contents of the buffer would be aspirated in positions A1, A2 and A3, etc.). However, at the conclusion of stage 4, rather than being moved directly to the In/Out position and removed from the wash wheel, the reaction vessel would be moved to station S26 where the substrate 180 would be dispensed (i.e., the beginning of stage 7) and the contents of the vessel would be mixed. From there, the vessel could be rotated to the In/Out position, from which it could be moved to another portion of the analyzer (e.g., an incubation wheel) to further advance the ALP/substrate reaction, thereby completing stage 7. Finally, at the end of stage 7, the reaction vessel could be moved to a luminometer such as shown in FIGS. 2A-2B for measurement of the light generated by the ALP/substrate reaction as shown in stage 8 of the assay 100 from FIG. 1.

Turning now to FIG. 4, that figure illustrates an example pipetting system 510 such as could be used to move pipettes between various probe receiving stations for dispensing and/or aspirating various fluids as described previously in the context of performing an assay 100. In FIG. 4, the example pipetting system 510 is configured to transfer fluids between a first probe receiving station PS1 (e.g., a reagent pack, a sample vessel, etc.) and a second probe receiving station PS2 (e.g., a station along the periphery of wash wheel 270). This may be done in part using first actuator 514 mounted to a first frame 512 mounted to the frame of the instrument. In the example of FIG. 4, the first actuator 514 is a linear actuator that provides movement along displacement d1. A sign convention has been defined with respect to the displacement d1. In particular, a first direction d1+ and an opposite second direction d1− have been defined for displacement d1.

In addition to the first frame 512, the example pipetting system 510 of FIG. 4 also includes a second frame 516. The second frame 116 may be mounted to the first actuator 514, and a second actuator 518 may be mounted to the second frame 516. As depicted, the second actuator 518 is a linear actuator that provides movement along displacement d2. A sign convention has been defined with respect to the displacement d2. In particular, a first direction d2+ and an opposite second direction d2− have been defined for displacement d2. As depicted, the displacements d1 and d2 are perpendicular. In other embodiments, the displacements d1 and d2 may be non-perpendicular (e.g., skew, parallel, etc.).

As depicted in FIG. 4, a probe P, including a probe tip PT, may be mounted to the second actuator 518. Accordingly, in the example pipetting system 510 of FIG. 4, by actuating the first and second actuators 514 and 518, the probe P and the probe tip PT can be moved to a plurality of locations within a two-dimensional space including the probe receiving stations PS1 and PS2. In other embodiments, an additional frame and/or an additional actuator may be provided (e.g., between the first frame 512 and the frame of the instrument) thereby allowing the probe P and the probe tip PT to be moved to a plurality of locations within a three-dimensional space.

The probe P may define an axis A. The probe receiving station PS may define an axis A0. The probe P may be aligned with the corresponding probe receiving station PS when the axes A and A0 are aligned within an acceptable tolerance.

In typical use, such as dispensing and aspiration of fluids as described in the context of FIGS. 1 and 3, the first actuator 514 axially aligns the probe P with the desired probe receiving station PS, PS1 and thereby aligns the axes A and A0. As illustrated at FIG. 4, the probe P and the probe receiving station PS1 of the example pipetting system 510 are aligned when the first actuator 514 is at an actuated position dp1. Upon alignment between the probe P and the probe receiving station PS, PS1, the second actuator 518 may move the probe P along its axis A and thereby along a probe path 300 (e.g., away from an actuated position ap1 of the second actuator 518). Upon the probe P dispensing and/or aspirating fluid at an actuated position in a probe receiving station, the probe P may retract along the probe path 300 and the first actuator 514 may then move the second frame 516 and thereby move the probe P, the probe tip PT and the probe path 300 to an additional receiving station within the range of the pipetting system.

It should be understood that, in practice, a clinical analyzer may incorporate multiple pipetting systems, for purposes such as allowing specialization of various assemblies. For example, in some cases, pipetting systems used to transfer reagents from reagent packs to a reaction vessel may be different from pipetting systems used to transfer samples from a sample vessel to a reaction vessel. In this type of system, the pipettor used for transferring reagents may have additional specialization to aid in this task. For instance, a reagent pipettor may be outfitted with a tip that allows it to perform ultrasonic mixing of a reagent in a reagent pack before aspirating it for transport to a reaction vessel, thereby ensuring that the aspirated reagent would not be impacted by any settling that may have taken place in the reagent pack. Sample pipettors may similarly be specialized. For instance, there may be multiple sample pipettors adapted to move portions of a sample either directly to a particular test (which would be done by a sample precision pipettor), or (via a sample aliquot pipettor) to a holding area (e.g., a sample wheel) in which the portion of the sample may be held for use in a later test (including, in some cases, a reflex test). Multiple pipetting systems may also be incorporated for reasons besides supporting multiple workflows. For example, some instruments may be provided with multiple pipetting systems to avoid individual pipetting systems becoming bottlenecks.

It should also be understood that, while one or more pipetting system(s) such as shown in FIG. 4 may be present in clinical analyzers that are implemented based on this disclosure, such pipetting systems are not a requirement, and other types of pipetting arrangements, either in combination with or as alternatives to systems such as shown in FIG. 4 may also be present. For example, in some embodiments, various vessel positions (e.g., positions S0 to S27 from FIG. 3) may have dedicated pipettors that could move up and down to interact with (e.g., dispense fluid into, aspirate fluid from) the vessels at their respective positions (e.g., wash buffer dispensing positions in a wash wheel such as shown in FIGS. 3A-3B), but would not have the additional degrees of freedom illustrated in FIG. 4. Accordingly, the above discussion of variations, like the discussion of the pipetting system 510 of FIG. 4, should be understood as being illustrative only, and should not be treated as limiting.

Figure 5:
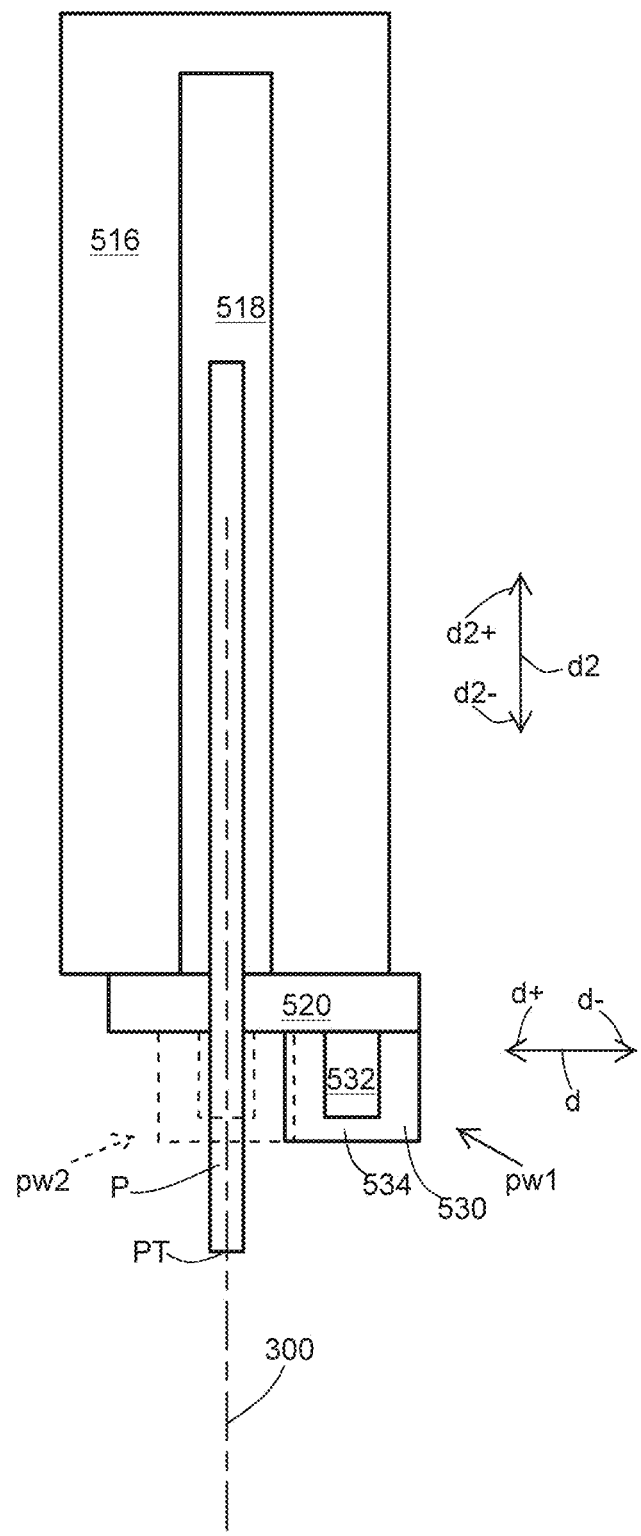
FIG. 5 illustrates an exemplary probe washing arrangement.

Turning now to FIG. 5, that figure illustrates an exemplary arrangement that could be used for washing probes in a pipetting system 510 such as shown in FIG. 4. The probe washing arrangement includes a hollow probe P, a frame 516, a probe actuator 518, a probe washer 530, and a probe washer actuator 520. The probe actuator 518 actuates the hollow probe P relative to the frame 516. The hollow probe P includes a tip PT. The probe actuator 518 moves the hollow probe P vertically along a probe path 300. The probe washer 530 cleans the hollow probe P, includes a cavity 532 that is adapted to receive at least a portion of the hollow probe P when the probe washer 530 is positioned at a deployed position pw2, intersects the probe path 300 when the probe washer 530 is positioned at the deployed position pw2 (shown in dashed line), and clears the probe path 300 when the probe washer 530 is positioned at a stowed position pw1. The probe washer actuator 520 moves the probe washer 530 between the deployed position pw2 and the stowed position pw1. The probe washer actuator 520 actuates the probe washer 530 relative to the frame 516.

In certain embodiments, the probe actuator 520 is adapted to move the hollow probe P between a stowed probe position and a probe washing position. The probe washer could correspondingly be moved relative to the probe path 300 by the third actuator 520 (e.g., to an actuated position pw2) such that the probe washer 530 (e.g., a cleaning cavity 532 of the probe washer 530 and/or a wall 534 at a bottom of the cleaning cavity 532) intersects the probe path 300 when cleaning or preparing to clean the probe P and thereby allows the probe P to pass into and out of the cleaning cavity 532 of the probe washer 530. The probe washer 530 could also be moved relative to the probe path 300 by the third actuator 120 (e.g., to an actuated position pw1) such that the probe washer 530 clears the probe path 300 when the probe P dispenses, aspirates, prepares for dispensing, and/or prepares for aspirating and thereby allows the probe P to pass by the probe washer 530.

Upon the axis A and the cavity axis being aligned, the second actuator 518 may advance the probe P to a washing position in which at least a portion of the probe P is within the cleaning cavity 532 of the probe washer 530. Upon the probe P or a portion thereof entering the cleaning cavity, the probe P may be internally and/or externally cleaned. Upon the probe P being cleaned, the second actuator 518 may retract the probe P to a stowed position and thereby remove the probe P or portion thereof from the cleaning cavity 532 of the probe washer 530.

It should be understood that, like the examples provided previously in this document, the probe washing arrangement of FIG. 5 is intended to be illustrative, and should not be treated as limiting. For instance, in some analyzers, a probe washing arrangement may include a cleaning fluid supply, a pump for transferring cleaning fluid into and/or out of a probe washer 530, and one or more valves for configuring fluid flow through the probe washer. The fact that these additional components are not explicitly illustrated in FIG. 5 should not be treated as implying that analyzers implemented based on this disclosure will necessarily lack such features. Similarly, in some cases, analyzers may be equipped with wash stations that are separate from pipetting assemblies, either as alternatives to, or in addition to, washing arrangements such as shown in FIG. 5. Such wash stations may include, for example, wash towers into which probes could be inserted for cleaning and wash dispensing pumps for dispensing fluid into and/or inside of a wash tower. Accordingly, while the mobile washing arrangement of FIG. 5 may be present in some analyzers implemented to include functionality described in this document, it should be understood that such mobile washing arrangements are intended to be illustrative only, and should not be treated as limiting on the scope of protection provide by this (or any related) document.

Figure 6:
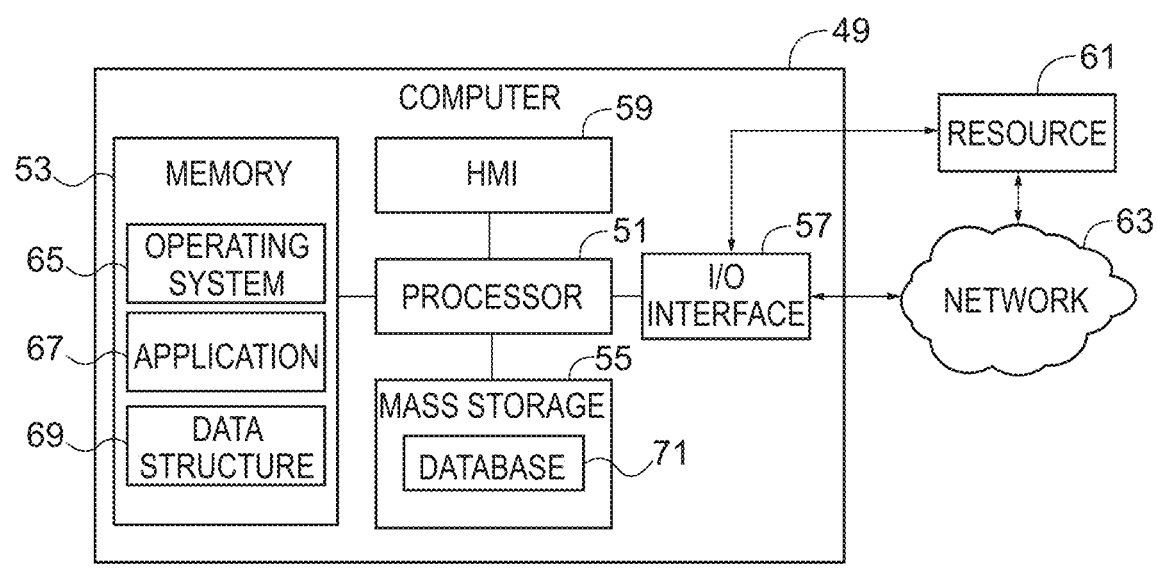
FIG. 6 illustrates an exemplary computer system.

Turning now to FIG. 6, that figure illustrates an exemplary computer system 49 that can be integrated into, or connected with, a clinical analyzer, and that could control various actions of the analyzer such as by sending commands to a wash wheel 270, a pipettor assembly 110 and/or other components. As shown in FIG. 6, such a computer system 49 may include a processor 51, a memory 53, a mass storage memory device 55, an input/output (I/O) interface 57, and a Human Machine Interface (HMI) 59. Computer system 49 may also be operatively coupled to one or more external resources 61 via a network 63 or I/O interface 57. External resources may include, but are not limited to, servers, databases, mass storage devices, peripheral devices, cloud-based network services, or any other suitable computer resource that may used by computer system 49.

Processor 51 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 53. Memory 53 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. Mass storage memory device 55 may include data storage devices such as a hard drive, optical drive, tape drive, non-volatile solid state device, or any other device capable of storing information.

Processor 51 may operate under the control of an operating system 65 that resides in memory 53. Operating system 65 may manage computer resources so that computer program code embodied as one or more computer software applications, such as an application 67 residing in memory 53, may have instructions executed by the processor 51. In an alternative embodiment, processor 51 may execute application 67 directly, in which case the operating system 65 may be omitted. One or more data structures 69 may also reside in memory 53, and may be used by processor 51, operating system 65, or application 67 to store or manipulate data.

The I/O interface 57 may provide a machine interface that operatively couples processor 51 to other devices and systems, such as network 63 or external resource 61. Application 67 may thereby work cooperatively with network 63 or external resource 61 by communicating via I/O interface 57 to provide the various features, functions, applications, processes, or modules comprising embodiments of the invention. Application 67 may also have program code that is executed by one or more external resources 61, or otherwise rely on functions or signals provided by other system or network components external to computer system 49. Indeed, given the nearly endless hardware and software configurations possible, persons having ordinary skill in the art will understand that different versions of the invention may include applications that are located externally to computer system 49, distributed among multiple computers or other external resources 61, or provided by computing resources (hardware and software) that are provided as a service over network 63, such as a cloud computing service.

HMI 59 may be operatively coupled to processor 51 of computer system 49 in a known manner to allow a user to interact directly with the computer system 49. HMI 59 may include video or alphanumeric displays, a touch screen, a speaker, and any other suitable audio and visual indicators capable of providing data to the user. HMI 59 may also include input devices and controls such as an alphanumeric keyboard, a pointing device, keypads, pushbuttons, control knobs, microphones, etc., capable of accepting commands or input from the user and transmitting the entered input to the processor 51.

A database 71 may reside on mass storage memory device 55, and may be used to collect and organize data used by the various systems and modules described herein. Database 71 may include data and supporting data structures that store and organize the data. In particular, database 71 may be arranged with any database organization or structure including, but not limited to, a relational database, a hierarchical database, a network database, or combinations thereof. A database management system in the form of a computer software application executing as instructions on processor 51 may be used to access the information or data stored in records of the database 71 in response to a query, where a query may be dynamically determined and executed by operating system 65, other applications 67, or one or more modules.

Figure 7:
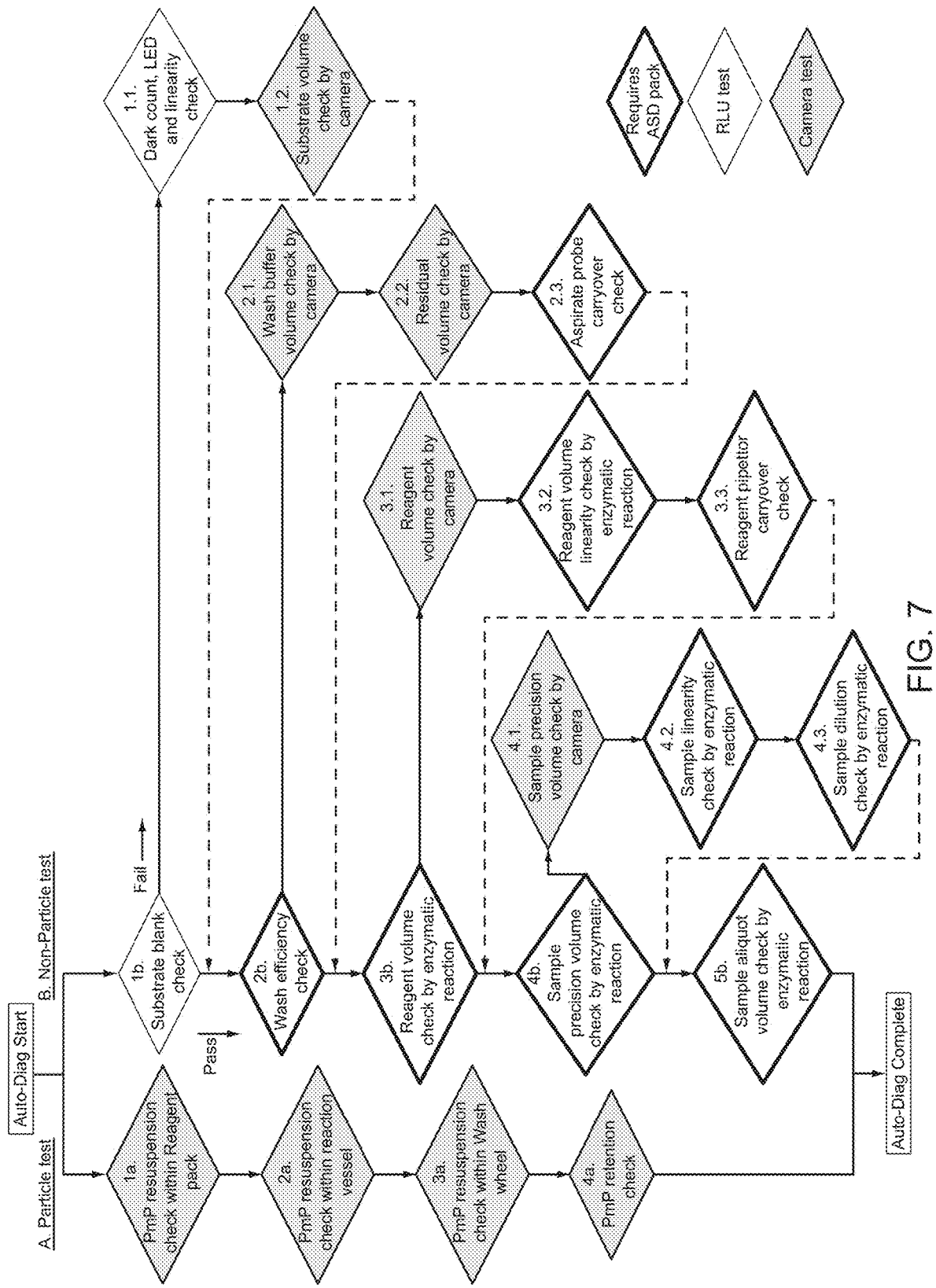
FIG. 7 illustrates exemplary steps that can be used to evaluate the operation of a clinical analyzer.

Turning now to FIG. 7, that figure illustrates steps that may be performed under the control of a computer such as shown in FIG. 6 to identify and/or remediate faults in an analyzer comprising components such as illustrated and discussed in the context of FIGS. 1-5. In various embodiments, performance of those steps could be triggered manually (e.g., by actuation of a control provided by the computer), could be performed on a scheduled basis (e.g., could be performed periodically), or could be performed based on external factors (e.g., when the disclosed technology was used to facilitate quality assurance as part of a manufacturing process, a process such as shown in FIG. 7 could be automatically performed at the end of an instrument's manufacturing process to confirm its proper functioning). Their performance could also be triggered in other ways, such as based on a combination of scheduling and external factors (e.g., performed periodically, but only if the instrument was not being used to analyze a sample).

Whatever triggers their performance, at a high level, the steps of FIG. 7 can be understood as being organized into two broad categories: a first category of steps that detects faults using machine vision and images captured by digital cameras, and a second category of steps that detects faults using a luminometer such as described in the context of FIGS. 2A-2B that would otherwise be used to detect chemiluminescent light during stage 8 of the assay 100 shown in FIG. 1. As illustrated in FIG. 7, it is possible that some approaches to automated diagnosis could take advantage of the existence of multiple diagnostic modes—i.e., camera and luminometer based fault detection—to allow different diagnostic sequences (shown in FIG. 7 as steps 1a-4a and steps 1b-5b) to be executed in parallel. Similarly, because luminometer based diagnostic steps will generally be more time consuming to allow for incubation or similar activities to take place, in some embodiments which also include camera based fault detection an entire camera based fault detection sequence may take place during an initial check from the luminometer based diagnostic steps. For instance, an embodiment following FIG. 7 may complete all of the camera steps 1a-4a while the first luminometer diagnostic step 1b is taking place. Accordingly, while the spatial relationships in the diagram of FIG. 7 may be seen as generally indicating various temporal relationships (e.g., the fact that sequences 1a-4a and 1b-5b are next to each other reflects that steps of those sequences may be performed in parallel), it should be understood that having temporal relationships corresponding to the spatial relationships of FIG. 7 is not mandatory, and should not be seen as limiting on the protection provided by this document or any related document.

Turning now to the sequence of steps 1a-4a in FIG. 7, those steps can be understood generally as identifying faults in the instrument's handling of paramagnetic particles using machine vision analysis of digital camera images. Starting with step 1a, that step determines if there is a fault in the instrument's extraction of reagents comprising paramagnetic particles from a reagent pack. To make this determination, some embodiments may utilize a specialized diagnostic reagent from a specialized diagnostic reagent pack (referred to as an ASD pack in FIG. 7) that differs from assay reagents in lacking any type of antibody component that might bind to an analyte in a patient sample, and that may also have higher concentrations than reagents that would be used in an assay (e.g., 2.0 mg/mL or higher of paramagnetic particles in a diagnostic paramagnetic particle reagent versus 0.2 to 2.0 mg/mL of paramagnetic particles in an paramagnetic particle reagent; 4.2 mg/L of ALP in a diagnostic ALP solution versus 0.1-2.0 mg/L of ALP in an ALP solution used in an assay). Such a diagnostic reagent pack may have an exterior factor that resembles that of, and may be loaded in the same manner as, a standard reagent pack.

In embodiments where a diagnostic reagent pack such as described above is used, the instrument may be configured to, upon loading of the diagnostic reagent pack, store it in a reagent storage area, and then automatically transfer it from the storage area to a reagent aspiration area when the diagnosis is to take place. Then, once the diagnostic reagent pack has been moved from storage, step 1a may be performed using a two step process. First, the PmP diagnostic reagent would be processed and transferred to a reaction vessel in the same manner as the first reagent 115 would be during an assay. For example, this could include applying an ultrasonic mix to the PmP diagnostic reagent in the reagent pack and, after it was mixed, transferring a predetermined volume of the PmP diagnostic reagent (e.g., 50 μL) to the reaction vessel using a reagent pipettor. Second, the mixed reagent in the reaction vessel would be imaged by a digital camera (e.g., a camera located proximate the dispensing position of the reaction vessel, or a camera located elsewhere on the instrument to which the reaction vessel would be moved for purposes of imaging), and a darkness check would be performed on the captured image(s) to determine if there had been a fault in the treatment of the PmP diagnostic reagent (e.g., if the mixed reagent in the reaction vessel had a grayscale value that was lighter or darker than expected). Additionally, in some embodiments this may be performed with multiple vessels (e.g., five vessels), either in parallel or sequentially, to provide additional information that could be used for determining if there had been a fault in the handling of the PmP diagnostic reagent.

After the treatment of the PmP diagnostic reagent within the reagent pack had been evaluated, an embodiment following FIG. 7 may either proceed to remediation (if a fault was identified) or to the next diagnostic step 2a. In scenarios where a fault is identified, the remediation may proceed by a computer such as shown in FIG. 6 providing a message on its interface indicating that there had been a fault in the handling of the PmP diagnostic reagent in the reagent pack (e.g., a failure of paramagnetic particle resuspension). This type of message may also include information on one or more steps to perform to remedy the fault—such as replacing a reagent pipettor tip used in performing the ultrasonic mix, recalibrating the ultrasonics, or replacing the instrument's ultrasonic transducer. If this remediation was unsuccessful, a call could be placed to request that a remote service engineer be dispatched to the instrument, and the remote service engineer could be informed of where the fault had taken place (e.g., in paramagnetic particle resuspension in the reagent pack) and what remediation activities had already been tried. In this way, the necessity of the remote service engineer having to perform an initial diagnostic check of the instrument when he or she arrived would be removed, and instead he or she could come pre-equipped with knowledge of where the fault had taken place and potentially with tools and/or spare parts (e.g., a replacement camera, in case the failure was in the pictures being taken rather than with the operation of the instrument) that could be used in fixing the fault. Alternatively, if the remediation was successful (e.g., as could be confirmed by rerunning the diagnostic step 1a) the process could proceed to the following diagnostic step 2a.

Turning now to the step 2a of checking for faults in resuspension within a reaction vessel, that step could be used to determine if there was a fault in an instrument's ability to resuspend paramagnetic particles in a reaction vessel after they had been magnetized. This could be done, for example, by processing (e.g., ultrasonic mixing inside the reagent pack) and feeding 50 µL of the PmP diagnostic reagent into a reaction vessel, along with 150 µL of wash buffer using a reagent pipettor. This combination could then be sent to the wash wheel where it could be magnetized (potentially without any related activities of dispensing further reagents, aspirating fluid or spin mixing) under the control of a computer such as shown in FIG. 6. After the magnetization, the reaction vessel could be moved back to the pipetting position and subjected to ultrasonic mixing to resuspend the particles in the solution. Finally, the resuspended mixture could be imaged by a digital camera for a darkness check in the same manner as described for the previous diagnostic step 1a. Also, in some embodiments the check for faults in resuspension within the reaction vessel could be performed with multiple (e.g., five) reaction vessels, just as the step 1a to check for proper treatment of the reagent within the reagent pack could be performed with multiple vessels to provide additional data for the identification of faults.

After the functionality of the instrument for resuspension within the reaction vessel had been evaluated, an embodiment following FIG. 7 may either proceed to remediation (if a fault was identified) or to the next diagnostic step 3a. In scenarios where a fault is identified, the remediation may proceed by a computer such as shown in FIG. 6 providing a message on its interface indicating that there had been a fault in the resuspension of particles within the reaction vessel, and may potentially accompany that message with one or more steps that could be used to remedy the fault—such as checking to ensure that the reagent pipettor is properly aligned to the reaction vessel at the pipetting position, and that the reagent pipettor is properly perpendicular. As with remediation in the context of the previous step 1a, if this was unsuccessful, a call could be placed to a service engineer, telling him or her where the fault was detected so that he or she could come pre-equipped to handle it directly and would not need to go through a diagnostic process himself or herself upon arrival. Alternatively, if the remediation was successful (as could be verified by rerunning the diagnostic step 2a where the fault had been identified) the process could proceed to the following diagnostic step 3a.

Turning now to step 3a of checking for faults in resuspension within the wash wheel, that step could be used to determine if there was a fault in the instrument's ability to resuspend paramagnetic particles without relying on ultrasonic mixing. This could be done, for example, by processing (e.g., ultrasonic mixing inside the reagent pack) and feeding 50 µL of the PmP diagnostic reagent into a reaction vessel, along with 150 µL of wash buffer using a reagent pipettor. This combination could then be sent to the wash wheel where it could be subjected to magnetization and spin mixing (potentially without related activities of dispensing additional wash buffer or aspirating fluid, or more than one aspiration+magnetization procedure). After the spin mixing, the reaction vessel could be imaged (e.g., using a camera at the reagent pipetting position after being moved back to that position, or using a camera located proximate the spin mix station of the wash wheel), and the image(s) could be used for a darkness check as described in the context of the previous diagnostic steps 1a-2a. Similarly, as with the previous diagnostic steps 1a-2a, this evaluation could be performed multiple times (e.g., with five different reaction vessels) to provide additional data for diagnosing faults, and or to ensure that, if there were multiple spin mix positions on the wash wheel, each of those positions was properly evaluated.

After the functionality of the instrument for resuspension within the wash wheel had been evaluated, an embodiment following FIG. 7 may either proceed to remediation (if a fault was identified) or to the next diagnostic step 4a. In scenarios where a fault is identified, the remediation may proceed by a computer such as shown in FIG. 6 providing a message on its interface indicating that there had been a fault in the resuspension of particles within the wash wheel, and may potentially accompany that message with one or more steps that could be used to remedy the fault—such as making sure that the position of the spin mixer was properly aligned to the reaction vessel and/or replacing a spin mixer. As with remediation in the context of the preceding steps 1a-2a, if this was unsuccessful, a call could be placed to a service engineer, telling him or her where the fault was detected so that he or she could come pre-equipped to handle it directly and would not need to go through a diagnostic process himself or herself upon arrival. Alternatively, if the remediation was successful (as could be verified by rerunning the diagnostic step 3a where the fault had been identified) the process could proceed to the following diagnostic step 4a.

Figure 8:
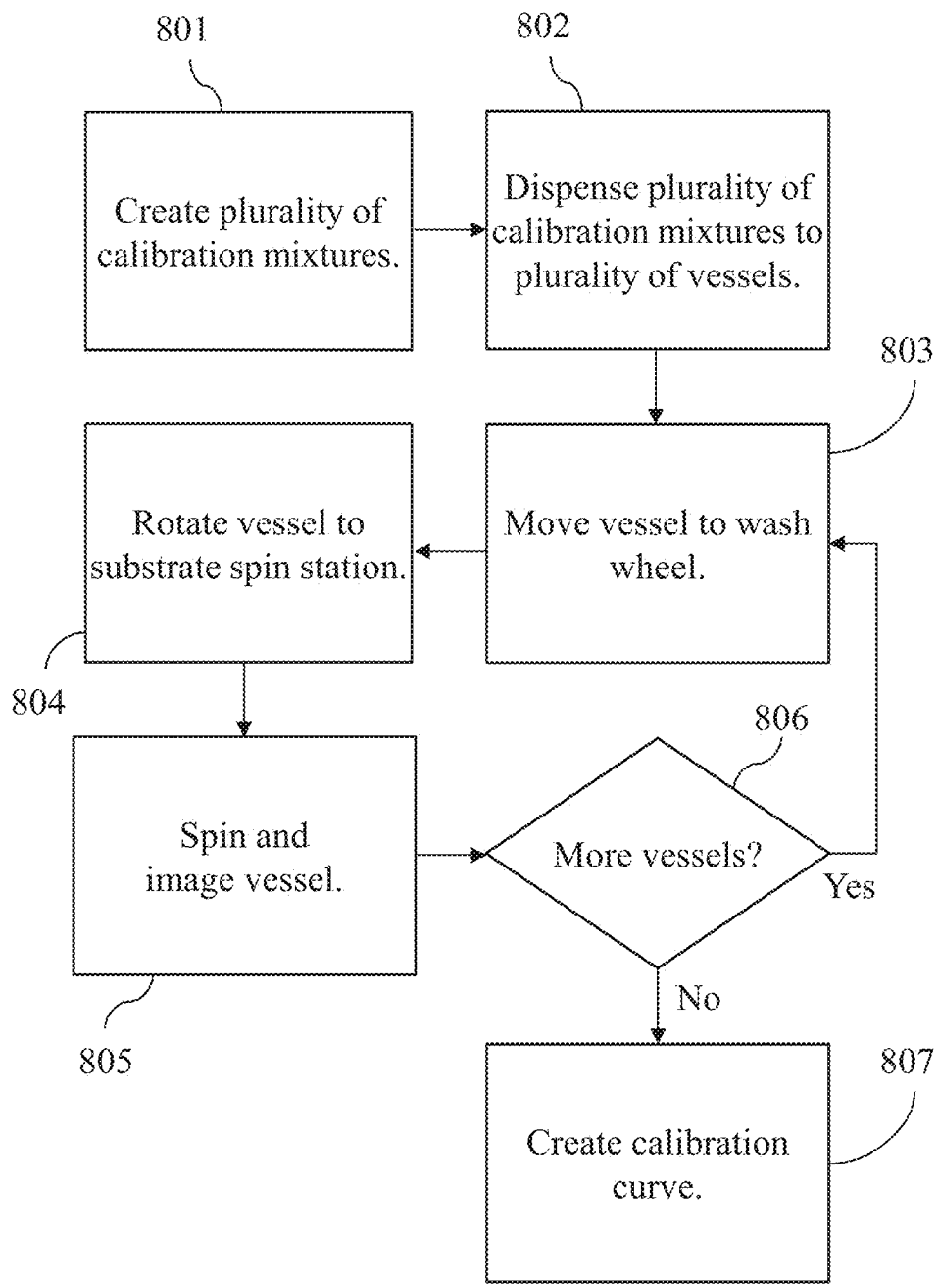
FIG. 8 illustrates steps that may be used to create a calibration curve.

Turning now to step 4a of checking for faults in retention of paramagnetic particles, that step could be used to determine if there were faults in the instrument's ability to flush a reaction vessel after an assay. In some embodiments, performing this step may involve execution of two subprocesses, one for creating a particle retention calibration curve (which may take place contemporaneously with the other diagnostic steps, or may be done in advance, such as before or at the time the instrument is installed), and one for using that calibration curve to identify faults in the operation of the instrument. Starting with the creation of the calibration curve, FIG. 8 illustrates a set of steps that may be performed in some embodiments to create this curve. As shown in FIG. 8, the creation of a calibration curve may begin with the creation 801 of a plurality of calibration mixtures, and the dispensing 802 of those calibration mixtures into a plurality of vessels. This may comprise adding proportions of PmP diagnostic reagent (also referred to herein as ASD reagent) and wash buffer to each of a plurality of vessels—for example, adding 50 µL of ASD reagent and 150 µL of wash buffer to five vessels, adding 40 µL of ASD reagent and 160 µL of wash buffer to five vessels, adding 35 µL of ASD reagent and 165 µL of wash buffer to five vessels, and adding 25 µL of ASD reagent and 175 µL of wash buffer to five vessels, for a total of 20 vessels with varying concentrations of the ASD reagent solution. After the calibration mixtures had been dispensed 802 into the vessels, each vessel could be moved 803 to the instrument's wash wheel and rotated 804 to the station on the wash wheel to the substrate spin position (i.e., a position on the wash wheel where, during an assay 100, the substrate 180 would be dispensed during stage 7 of FIG. 1). There, the vessel would be spun and imaged 805. Then, if there were more vessels 806, the process would be repeated until all vessels had been spun and imaged 805, at which point the images of the various vessels with their various concentrations of ASD solution would be used to create 807 a calibration curve of grayscale values to indicate various concentrations of paramagnetic particles in a mixture.

To make use of a calibration curve once it is available, a computer such as shown in FIG. 6 could cause an instrument to create a test mixture of ASD reagent and wash buffer (e.g., 50 µL of ASD reagent and 150 µL of wash buffer) in each of a plurality of vessels (e.g., five vessels), and then send those vessels to the wash wheel to undergo a full wash process (e.g., adding wash buffer, spin mixing and aspirating the vessel being tested at least twice) without adding substrate or ALP. The washed vessels could then be sent back to a wash buffer dispensing position where another portion (e.g., 200 µL) of wash buffer could be dispensed into them, at which point they could be sent to the substrate spin position of the wash wheel, spun and imaged. The images could then be compared with the previously generated calibration curve to determine if there had been a fault in the washing process such that excessive particles were retained. If a fault was detected, then remediation could proceed as described for the previous diagnostic steps 1a-3a, with remediation steps potentially including aligning aspiration probes to the reaction vessel and/or inspecting the magnetic functions of the instrument to ensure that they were functioning properly.

Turning now to the sequence of steps 1b-5b in FIG. 7, those steps can be understood generally as testing various subsystems of the instrument in the opposite order in which those subsystems would be used in an assay, with each subsequent test generally leveraging one or more subsystems that had been validated previously. Following that general framework, the substrate blank check 1b can test the instrument's chemiluminescence detection subsystem (i.e., the luminometer, as illustrated in FIGS. 2A-2B, along with the components used to dispense substrate into a reaction vessel in stage 7 of an assay 100 as illustrated in FIG. 1) to ensure that it does not generate spurious light detection signals. This may be done, for example, by adding substrate adapted to generate chemiluminescent light in the presence of ALP into a plurality of vessels (e.g., ten vessels), incubating the vessels as if they were being used in an assay (e.g., incubating for 48 seconds), and then using the luminometer to detect luminance in each of the vessels after it had been incubated. In this case, if the luminometer detected an unexpectedly high amount of light being generated from a vessel (e.g., greater than approximately 6,000 RLU), it would indicate a fault, since there should have been no ALP in the vessel for the substrate to react with and generate more than the amount of light that would be expected from a blank reading. Accordingly, if a fault was detected, it could be remediated by changing the instrument's substrate bottle (i.e., the bottle which holds the substrate prior to it being dispensed into a vessel) and/or decontaminating the instrument's substrate line (i.e., the tube or other conveyance that would transport the substrate from the substrate bottle to a reaction vessel) to ensure that neither of those components were acting as a source of contamination. If these steps were successful, the process could proceed to the next diagnostic step 2b. Otherwise second line support (e.g., a support engineer) may be invoked, or extended diagnostics steps may be performed to help further identify and/or remediate the fault.

In embodiments where remediation of a substrate blank check 1b fault can be addressed by performing extended diagnostic and/or remediation steps, the extended steps may include performing a dark count, LED and linearity check 1.1 to determine if the unexpected (and unwanted) light readings may have been caused by the luminometer itself rather than by contamination causing a chemiluminescent reaction. This may include taking a reading in the luminometer when no vessels were present to confirm that no unexpected signal was detected, turning on the LED 620 and reading the signal in the luminometer to confirm that the detected signal corresponds to the illumination from the LED, and changing the light intensity of the LED (e.g., illuminating it using 0.5, 0.8, and 1.2 pW) to confirm that readings taken by the luminometer at each intensity level correspond to the expected signal values. If these extended diagnostic checks 1.1 fail, then remediation steps may be performed (or, as with the case of other remediation steps, a computer such as shown in FIG. 6 may indicate that they should be performed), including cleaning the luminometer box, recalibrating the luminometer and/or replacing the luminometer. Alternatively, if this extended diagnostic check 1.1 does not identify the root cause of the failure in the substrate blank check 1b, a second line support resource (e.g., a field service engineer) may be invoked or, in some embodiments, an additional extended diagnostic and remediation sequence 1.2 may be initiated.

In embodiments where a failure of the dark count, LED and linearity check 1.1 to identify the root cause of a failure in the substrate blank check 1b is treated as triggering additional extended diagnostic/remediation steps, those additional steps may include a substrate volume check 1.2 performed by a camera. In embodiments where this type of check is performed, it may be performed by dispensing a predefined volume of substrate into a plurality of vessels (e.g., dispensing 200 µL of substrate in to each of ten vessels), then capturing images of those vessels and calculating the volume of substrate in each of them (e.g., based on the distance between the meniscus of the substrate and the bottom of the vessel along with the cross sectional area of the vessel). If this check reveals that the substrate is not properly being dispensed, it can be remediated by performing acts such as replacing the substrate dispense probe. Then, if the substrate volume check 1.2 did not identify the root cause of the failure in the substrate blank check 1b, or if the additional remediation activities did not address the failure, a second line support resource could be invoked to address the failure. Alternatively, if the substrate volume check 1.2 identified the root cause of the failure in the substrate blank check 1b, and (if the root cause was identified) the remediation steps successfully addressed the root cause and eliminated the failure in the substrate blank check 1b (or if there was no failure in the substrate blank check 1b), the diagnostic process could continue to the next step 2b to evaluate the operation of the assay washing subsystem (i.e., the components on the instrument that would ensure that unbound particles are properly removed from a reaction vessel during an assay, such as aspiration probes, and wash towers and/or probe washing systems such as shown in FIG. 5).

Figure 9:
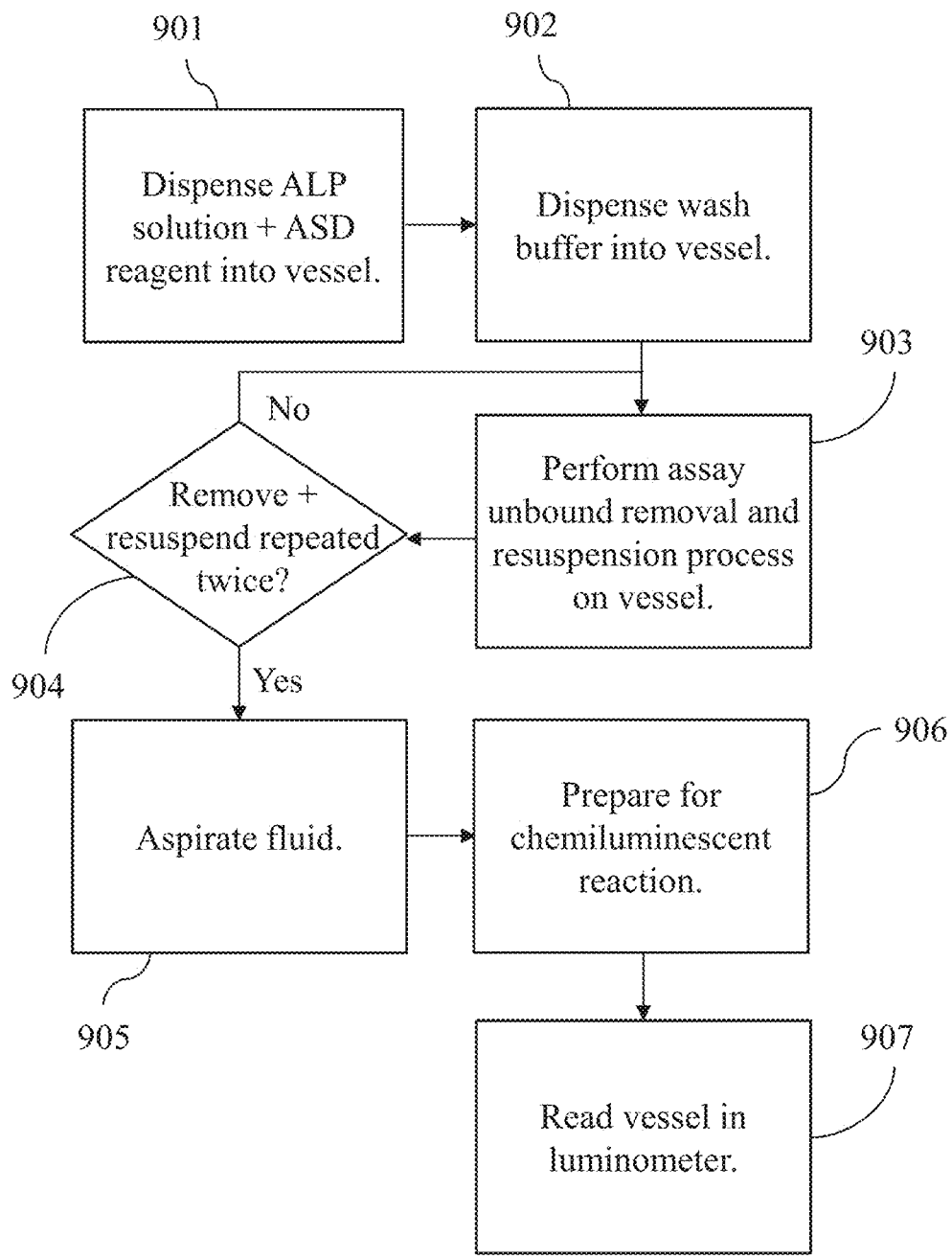
FIG. 9 illustrates a process that can be used to perform a wash efficiency check.

Turning now to the wash efficiency check step 2b, in some embodiments this may be performed by a process such as shown in FIG. 9. Initially, in the process of that figure the ASD reagent and ALP solution (preferably ALP solution from an ASD pack) would be dispensed 901 into a reaction vessel to create a testing mixture (e.g., a mixture of 50 µL ASD reagent and 150 µL of ALP solution) using the reagent pipettor. An additional volume of wash buffer (e.g., 300 µL of wash buffer) could then be dispensed 902 into the vessel. Then the same processes that would be used during an assay to remove unbound particles and resuspend the remainder—i.e., magnetizing the vessel (e.g., for 48 seconds), aspirating the fluid from the vessel, adding an additional 500 µL of wash buffer, and spin mixing the vessel to resuspend its contents) could be performed 903 on the combined contents of the vessel. A check 904 could then be performed to determine if this had been repeated two or more times (which, as shown in FIG. 1, it would be during an assay 100) and, if it had not the unbound removal and resuspension process could be repeated. Otherwise, the fluid could be aspirated 905 from the vessel, and it could be prepared 906 for a chemiluminescent reaction by adding substrate (e.g., 200 µL of substrate), spin mixing it, and incubating (e.g., for 48 seconds). Finally, the vessel could be read 907 in the luminometer to determine if an unexpectedly high amount of light was detected (which would indicate that there was a fault in the wash process resulting in an excessive amount of the ALP solution (e.g., more than would generate 20,000 RLU in reaction with the substrate) remaining in the vessel to react with the substrate). Additionally, as with the other diagnostic steps, the wash efficiency check step 2b could be performed with multiple vessels (e.g., ten vessels) to provide additional data that could be used in determining if there was a fault in the system.

If a fault is identified in the wash efficiency check step 2b, a support resource (e.g., field service engineer) could be enlisted, or, in some embodiments, one or more remediation steps might be performed to attempt to address the fault. For example, alignment of the position of a wash wheel pick and place apparatus (i.e., the device that would transport the reaction vessel to the wash wheel) relative to the in/out station on the wash wheel could be checked. Additionally, if this did not remedy the fault, then one or more extended diagnostic steps could be performed. For example, as shown in FIG. 7, this may include performing a wash buffer volume check 2.1 using a camera. In some embodiments, this check 2.1 could be done by using the probes that would be used to dispense wash buffer into a reaction vessel during an assay to dispense a known quantity (e.g., 200 µL) wash buffer into corresponding sets of test vessels, then rotating those test vessels to a position on the wash wheel proximate to a camera (e.g., a substrate dispensing position), imaging the vessels and calculating the volume of wash buffer actually added to the vessels using the images. This could include dispensing 200 µL of wash buffer into each of five vessels using a QS probe (i.e., a probe that would be used to add wash buffer to a reaction vessel at the QS position shown in FIG. 3B), into each of five vessels using a D1 probe (i.e., a probe that would be used to add wash buffer to a reaction vessel at the D1 position shown in FIG. 3B), and into each of five vessels using a D2 probe (i.e., a probe that would be used to add wash buffer to a reaction vessel at the D2 position shown in FIG. 3B). Then, if the captured images indicated that the volume actually dispensed by one or more of the probes was different from what was expected, the process could proceed with one or more extended remediation steps such as replacing the wash dispense syringes (i.e., the probes) that would be used to dispense wash buffer into the reaction vessels where the discrepancy was noted. Alternatively, if the wash buffer volume check by camera 2.1 did not identify the root cause of the failure of the wash efficiency check 2b, an additional extended diagnostic step 2.2 of checking residual volume by camera could be performed.

In embodiments where a failure of a wash efficiency check 2b could lead to an extended diagnostic step 2.2 of checking the residual volume by a camera, this check 2.2 could be used to confirm that the probes that would be used to aspirate fluid from a reaction vessel during an assay were functioning as expected. This could include, for example, 1) using each of the probes that would dispense wash buffer into a reaction vessel for an assay (e.g., QS, D1 and D2 probes) to a known quantity of wash buffer (e.g., 500 µL of wash buffer) into each vessel from a corresponding set of vessels (e.g., each probe may have a set of five corresponding vessels); 2) rotating the vessels to an aspiration position on the wash wheel corresponding to the probe used to dispense wash buffer into that vessel (e.g., moving the vessels that had wash buffer dispensed by the QS probe to a first aspiration position, the vessels that had wash buffer dispensed by the D1 probe to a second aspiration position, and the vessels that had wash buffer dispensed by the D2 probe to a third aspiration position; alternatively, in an instrument where the reaction vessel could have wash buffer dispensed and aspirated in the same position, such a vessel may not be moved at all); 3) aspirating the fluid from the vessels; and 4) rotating the vessels to a camera position (i.e., a position on the was wheel proximate to a digital camera) where images could be taken and used for volume calculation. If the volume calculation indicated a failure in the aspiration (i.e., if more than a threshold amount of fluid, which, in some embodiments, could be any fluid, remained in a vessel after aspiration then it would be treated as a failure in aspiration) one or more remedial steps may be performed to address that failure. These steps could include replacing the aspirate probe(s) corresponding to the vessel(s) where the failure had been detected, ensuring that the aspirate probe(s) corresponding to the vessel(s) where the failure had been detected were properly aligned to their reaction vessel station(s), and/or replacing the peristaltic pump tubing that would be used by the aspiration probe(s) to move the unbound liquid from a reaction vessel to a waste receptacle.

Alternatively, if the residual volume check by camera 2.2 had not identified the root cause of the failure of the wash efficiency check, in some embodiments, a diagnostic process such as shown in FIG. 7 could proceed with an additional extended diagnostic step of performing an aspiration probe carryover check 2.3. In embodiments where such an additional extended diagnostic step is present, it could be performed by, for example, adding diagnostic ALP solution and wash buffer to each of a plurality of vessels (e.g., adding 200 μL of diagnostic ALP solution and 200 μL of wash buffer to each of ten vessels), sending the vessels to the position from which fluid would be aspirated from reaction vessels being washed between assays, aspirating the fluid, preparing the vessels for chemiluminescent reaction (e.g., adding substrate, spin mixing and incubating, as described in the context of FIG. 9), and then reading them with the luminometer. If these luminometer readings detected chemiluminescent light it could be treated as indicating that there was a problem with the aspiration probe, as otherwise all of the ALP would have been removed prior to the vessel being prepared for a chemiluminescent reaction, and a variety of remedial measures could be taken. These could include replacing the aspirate probe, investigating the condition of the wash tower which should have cleaned the probes involved in the failed test, and/or replacing the pump used to dispense the wash buffer. If these actions failed to address the root cause of the wash efficiency check failure 2b, additional resources (such as a field service engineer who had been informed of the fault and what steps had been taken to diagnose and remediate it or its root causes) could be deployed. Alternatively, if the actions were successful, the process could proceed to the next diagnostic step 3b.

Turning now to the luminometer reagent volume check step 3b, this step could be used to evaluate the functioning of the instrument's reagent dispensing subsystem (i.e., the components used to handle reagents during an assay, such as reagent pipettors, and ultrasonic transducers). In some embodiments, this reagent volume check step 3b could be performed by adding a predetermined volume of diagnostic ALP solution (e.g., 50 μL of ALP solution) to each of a plurality of vessels (e.g., ten vessels) using a reagent pipettor, preparing the vessels for a chemiluminescent reaction by adding substrate (e.g., 200 μL of substrate), spinning and incubating them as described in the context of FIG. 9, and then using the luminometer to read the chemiluminescent light generated by the reaction of the substrate and the ALP solution. If this reading was not consistent with (e.g., within 10% of) the expected amount of light based on the volume of ALP solution and substrate added to the vessel, one or more remedial actions, such as aligning the reagent pipettor with the reaction vessel and/or the reagent pack, could be taken to address the inconsistency. If these actions were successful (or if no inconsistency was detected) a process such as shown in FIG. 7 could proceed to the next diagnostic step 4b. Otherwise, one or more extended diagnostic steps may be performed to try and identify a root cause of the inconsistency and, if the root cause of the inconsistency could be identified, to remediate it.

In the event a luminometer reagent volume check 3b identifies a fault in the reagent dispensing subsystem, in some embodiments one or more extended diagnostic actions may be performed. As shown in FIG. 7, these extended diagnostic actions may include performing a camera reagent volume check 3.1 which, in some embodiments, may be performed in a manner similar to that of the substrate volume check 1.2 described previously, except that instead of dispensing substrate a camera reagent volume check 3.1 will preferably be performed with a less expensive type of fluid, such as wash buffer. That is, in the camera reagent volume check, a known volume of wash buffer may be dispensed into a plurality of vessels (e.g., 200 μL of wash buffer could be dispensed into each of five vessels) using the reagent pipettor, those vessels could be imaged, and the volume of wash buffer in the images could be compared with the expected volume to determine if there had been an error in the operation of reagent pipettor. If this camera reagent volume check 3.1 identifies an error, a variety of remedial actions could be taken to address it, such as replacing the syringe used for reagent dispensing (i.e., the reagent pipettor), and/or replacing the motor used to generate pressure differences for conveying the reagents from the reagent pack to the reagent pipettor and from the reagent pipettor to a reaction vessel (i.e., the reagent dispense motor). If these remediation activities are sufficient to address the root cause of the failure of the luminometer reagent volume check 3b, the diagnostic procedure could proceed to the next step 4b. Otherwise, an additional extended diagnostic measure in the form of a reagent volume linearity check 3.2 could be performed.

In an embodiment where a failure in luminometer reagent volume check 3b leads to an extended diagnostic check of performing a reagent volume linearity check 3.2, the reagent volume linearity check 3.2 could include adding different combinations of diagnostic ALP solution and wash buffer to different sets of vessels, preparing them for a chemiluminescent reaction as described in the context of FIG. 9, and then read the light emitted from the vessels using the luminometer. For example, in some embodiments, this could include adding 50 μL of ALP solution to ten vessels, adding 25 μL of ALP solution and 25 μL of wash buffer to ten vessels, and adding 10 μL of ALP solution and 40 μL of wash buffer to ten vessels, then adding 200 μL of substrate to each of the vessels and measuring the light generated by the reaction between the ALP and substrate in each of the vessels. After making the light measurement, if there was a disagreement between the measured light and what was expected based on the volumes of ALP solution in the various vessels, this could be treated as an indication of the root cause of the failure in the luminometer reagent volume check, and one or more remedial actions can be taken to address it. These remedial actions could include checking reagent pipettor perpendicularity, replacing the tip of reagent pipettor, and/or replacing the ultrasonic transducer. Alternatively, if the reagent volume linearity check 3.2 did not indicate a root cause of the failure of the luminometer reagent volume check 3b, an additional extended diagnostic step could be performed in the form of a reagent pipettor carryover check 3.3.

In an embodiment where a failure in luminometer reagent volume check 3b leads to a reagent pipettor carryover check 3.3, the reagent volume carryover check may be performed in a manner very similar to the aspirate probe carryover check 2.3 discussed previously. For example, in some embodiments 50 μL of diagnostic ALP solution and wash buffer could be added alternately to each of ten vessels, then the vessels could be prepared for a chemiluminescent reaction by adding 200 μL of substrate, mixing and incubating them, and then reading whatever chemiluminescent light was generated using the luminometer. Then, if the light measured by the luminometer was greater than what was expected based on the volume of ALP and substrate, this could be treated as an indication of the root cause of the failure of the luminometer reagent volume check 3*b* and one or more remedial actions could be performed to address it. These remedial actions could include replacing the reagent pipettor tip, investigating the condition of the wash tower, and/or replacing the wash dispense pump. If these remedial actions were unsuccessful in remediating the failure (or if the reagent pipettor carryover check 3.3 did not indicate the root cause of the failure), an additional resource (e.g., a field service engineer) could be called in to address the issue. Otherwise, if the remediation was successful in addressing the root cause of the failure of the luminometer reagent volume check 3*b*, the diagnostic procedure could proceed with a luminometer sample volume check 4*b*.

Turning now to the luminometer sample volume check 4*b*, that check may be used in some embodiments to evaluate the performance of the sample dispensing subsystem (i.e., the components used in the instrument to transfer portions of patient sample from a sample vessel to a reaction vessel, such as various sample pipettors, and the sample dispensing motor that creates pressure differentials to aspirate and/or dispense portions of a sample to/from a vessel). This may be done by performing activities including adding a predefined volume of diagnostic ALP solution (e.g., 100 μL) to each of a plurality of vessels (e.g., ten vessels) that would act as sample vessels using a reagent pipettor. A luminometer sample volume check 4*b* may also include aliquoting a portion (e.g., 50 μL) of the ALP solution from each of the vessels acting as sample vessels to vessels in another plurality of vessels that would act as reaction vessels using the instrument's sample precision pipettor. Each of the vessels acting as reaction vessels could then be prepared for a chemiluminescent reaction as described previously in the context of FIG. 9 (i.e., have substrate added, then be mixed and incubated), and the light given off by the contents of the reaction vessels could be measured by the luminometer. In the event that there was an inconsistency between the light detected by the luminometer and the light expected based on the volume of ALP and substrate dispensed into the reaction vessels, this could be treated as a fault, and remediation actions such as checking position of the sample precision pipettor relative to the reaction vessel could be performed to try and address it. If these actions were successful, a diagnostic process such as shown in FIG. 7 could continue with using the luminometer to check other pipettors (e.g., sample aliquot pipettors) that might be used for transferring portions of a patient sample from a sample vessel. Otherwise, one or more extended diagnostic and remedial actions could be performed to identify and address the root cause of the luminometer sample volume check failure.

As shown in FIG. 7, in some embodiments extended diagnostic activities to identify a root cause of a luminometer sample volume check failure may include a camera sample volume check 4.1. Such a camera sample volume check 4.1 may include adding a first volume of wash buffer to a plurality of vessels (e.g., adding 100 μL of wash buffer to each of 5 vessels) that will act as sample vessels for the purpose of this test using the reagent pipettor, aspirating a portion of that wash buffer (e.g., removing 30 μL of wash buffer from each of the vessels acting as sample vessels) using the sample precision pipettor, and then imaging the vessels to determine the actual volume of wash buffer remaining after the aspiration (e.g., by measuring a distance between a bottom of the meniscus of the wash buffer to the base of the vessel and multiplying that distance by the vessel's cross sectional area). Additionally, in some embodiments a camera sample volume check 4.1 may also dispense wash buffer aspirated from the sample vessels into new vessels that would act as reaction vessels for this test. For instance, in some embodiments, in addition to (or as an alternative to) aspirating wash buffer from a sample vessel and imaging the sample vessel, that wash buffer (or a portion thereof) may be dispensed into new vessels that would be treated as reaction vessels for the purpose of the test (either on its own or in combination with additional wash buffer aspirated from the sample vessel). For example, in some embodiments, for each vessel being treated as a sample vessel for purposes of the test 25 μL of wash buffer may be dispensed into a first vessel acting as a reaction vessel, and 10 μL of wash buffer may be dispensed into a second vessel acting as a reaction vessel. In this type of embodiment, images may be captured of each vessel acting as a reaction vessel after wash buffer is dispensed into it, and images may also be captured of the sample vessel after (and if) any additional wash buffer is aspirated from it.

Ultimately, whatever images were captured as part of the camera sample volume check 4.1 could be analyzed to determine the volume of wash buffer in the imaged vessels. These volumes could then be compared with the volumes that should have been present based on the amount of fluid that (should have been) aspirated and/or dispensed, and any discrepancies could be treated as indicating a potential root cause of the failure of the luminometer sample volume check 4*b*. This could then trigger remedial activities such as replacing the sample dispense syringes on the precision pipettor, and/or contacting a field service engineer and telling him or her of the subsystem where the fault was detected, what the root cause of the fault appeared to be, and what (if any) remedial activities had been tried to address that root cause. Alternatively, if there was no discrepancy between the actual and predicted volumes in the imaged vessels, a diagnostic process such as shown in FIG. 7 could continue with additional extended diagnostic activities to continue seeking the root cause of the failure in the luminometer sample volume check 4*b*.

As shown in FIG. 7, in some embodiments which include extended diagnostic steps that could be performed to determine the root cause of a failure in a luminometer sample volume check 4*b*, these extended diagnostic steps may include a luminometer sample volume linearity check 4.2. The performance of this type of check 4.2 may begin with using a reagent pipettor to add a predetermined volume of diagnostic ALP solution to each of a plurality of vessels that would act as sample vessels for this test (e.g., adding 100 μL of ALP solution to each of 30 vessels). The sample precision pipettor may then be used to move portions of that solution to vessels that will act as reaction vessels for the test, and the reagent pipettor can be used to add wash buffer to those vessels so that the total amount of fluid in each of them is the same regardless of how much ALP solution was added by the sample precision pipettor. For example, in some embodiments ten reaction vessels could be filled with 50 μL of ALP solution, ten more could be filled with 25 μL of ALP solution and 25 μL of wash buffer, and a final ten could be filled with 10 μL of ALP solution and 40 μL of wash buffer. Then, after the appropriate amounts of ALP solution and wash buffer had been added to the vessels that would act as reaction vessels, those vessels could be prepared for a chemiluminescent reaction as described in the context of FIG. 9, and the luminometer could be used to measure the light emitted by those vessels' contents. If this measured light did not match the expected amount of light based on the various volumes of ALP solution in each of the vessels, this could be treated as indicating a potential root cause of the failure of the luminometer sample volume check, and remedial actions, such as replacing the sample dispensing motor, could be triggered. Alternatively, if there was no discrepancy, an additional luminometer sample dilution check 4.3 could be performed to continue seeking to identify the root cause of the failure of the luminometer sample volume check 4*b*.

In embodiments where it is present, a luminometer sample dilution check 4.3 could extend on the basic concept of transferring fluids from vessels that would be acting as sample vessels to vessels that would act as reaction vessels by adding intermediate vessels where the fluids would be diluted. Thus, a luminometer sample dilution check 4.3 could begin with using a reagent pipettor to transfer a predetermined amount of ALP solution to a plurality of vessels that would act as sample vessels for that test (e.g., adding 100 µL of ALP solution to each of 20 vessels). Then, varying amounts of wash buffer could be added to each of a plurality of vessels that would act as dilution vessels using a reagent pipettor, and then, for each of the sample vessels, a portion of the ALP solution could be transferred using the sample precision pipettor to one of the dilution vessels in an amount corresponding to the wash buffer that had previously been added. For example, in some embodiments ten dilution vessels would have 245 µL of wash buffer and 5 µL of ALP added, and ten dilution vessels could have 180 µL of wash buffer and 20 µL of ALP added. The dilution vessels could then be mixed, and a portion (e.g., 50 µL) of the mixture from each vessel could be moved using the sample precision pipettor from each dilution vessel to a corresponding reaction vessel. Each of the reaction vessels could then be prepared for a chemiluminescent reaction as described in FIG. 9, and the light emitted from the vessels could be measured using the luminometer.

If, in a luminometer sample dilution check 4.3, the amount of light measured by the luminometer was inconsistent with an expected light value based on the amount of ALP that should have reacted with the substrate in that vessel (e.g., in a situation where 20× and 50× dilutions of ALP are created, the expected light values from those dilutions would be $\frac{1}{20}$ and $\frac{1}{50}$ compared to a non-diluted signal), this could be treated as indicating a root cause of the failure of the luminometer sample volume check. This could then be addressed by performing one or more remediation actions, such as checking if the immersion height of the tip of the sample precision pipettor was different from what would be expected given the design parameters of the instrument. This information could then be used to address the issue (e.g., by adjusting the operation of the sample precision pipettor so the immersion height would match the instrument's design parameters). Alternatively, it could be used to proceed to further remediation/diagnostic actions, such as calling a field service engineer and informing him or her that there appeared to be a problem with the immersion height of the sample precision pipettor or that there was a failure in the luminometer sample volume check where no root cause had been found, as appropriate. Ultimately, once the failure in the luminometer sample volume check 4*b* had been remedied, the process of evaluating the operation of the remaining system(s), if any, of the instrument could proceed.

Turning now to the luminometer sample aliquot volume check 5*b*, that step could be used to check the operation of the instrument's sample aliquot subsystem. In some embodiments, this could be done in essentially same fashion as the luminometer sample volume check 4*b*, except that, instead of transferring ALP from the sample vessels to the reaction vessels with the sample precision pipettor, the transfer would be done using a teh sample aliquot pipettor. Then, if the chemiluminescent light detected by the luminometer in the reaction vessels was not consistent with expected light values based on the amount of ALP that should have been transferred, this can be treated as indicative of a fault in the sample aliquot subsystem. This can then trigger one or more remedial actions, such as investigating the level sense function of the sample aliquot pipettor, and/or replacing the sample aliquot syringe used on that pipettor (i.e., the pipettor tip), either to avoid, or as a prelude to, invoking additional support resources for addressing the detected fault.

The various features of the various embodiments may be combined in various combinations with each other and thereby yield further embodiments according to the principles of the present disclosure.

Various modifications and alterations of this disclosure will become apparent to those skilled in the art without departing from the scope and spirit of this disclosure, and it should be understood that the scope of this disclosure is not to be unduly limited to the illustrative embodiments set forth herein. Instead, the protection provided by any document related to this document should be defined by such document's claims when the terms in those claims that are not explicitly defined are given their broadest reasonable interpretation as provided by a general purpose dictionary.

For the purpose of understanding the claims set forth in this document, the following terms and phrases should be understood as having the following meanings.

When used in the claims, "based on" should be understood to mean that something is determined at least in part by the thing that it is indicated as being "based on." For a claim to indicate that something must be completely determined based on something else, it will be described as being "based EXCLUSIVELY on" whatever it is completely determined by.

When used in the claims "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. A reference to a "computer readable medium" being "non-transitory" should be understood as being synonymous with a statement that the "computer readable medium" is "tangible", and should be understood as excluding intangible transmission media, such as a vacuum through which a transient electromagnetic carrier could be transmitted. Examples of "tangible" or "non-transitory" "computer readable media" include random access memory (RAM), read only memory (ROM), hard drives and flash drives.

When used in the claims, "means for automatically diagnosing faults in the operation of the machine" should be understood as a limitation set forth in means+function form as provided in 35 U.S.C. § 112(f) in which the function is "automatically diagnosing faults in the operation of the machine" and the corresponding structure is a computer such as shown in FIG. 6 configured to perform a process as shown in FIG. 7.

What is claimed is:

1. A method of operating and diagnosing faults in a laboratory instrument comprising a plurality of subsystems, the method comprising:
   a) performing an analytic sequence of steps to analyze a biological sample, wherein the analytic sequence of steps utilizes a set of subsystems from the plurality of subsystems of the laboratory instrument in a first order; and
   b) performing a set of diagnostic steps to identify faults in the laboratory instrument, wherein:
      i) performing the set of diagnostic steps comprises evaluating each subsystem in the set of subsystems in a second order;
      ii) the second order in which each subsystem in the set of subsystems is evaluated reverses the first order in which the set of subsystems are used in the analytic sequence of steps.

2. The method of claim 1, wherein:
   a) the set of subsystems comprises:
      i) a sample dispensing subsystem; and
      ii) a chemiluminescence detection subsystem;
   b) the first order comprises using the sample dispensing subsystem to dispense a biological fluid into a reaction vessel before using the chemiluminescence detection subsystem to detect chemiluminescent light from the reaction vessel; and
   c) the second order comprises evaluating operation of the chemiluminescence detection subsystem before evaluating operation of the sample dispensing subsystem.

3. The method of claim 2, wherein:
   a) evaluating the chemiluminescence detection subsystem comprises, for each of a set of one or more vessels, performing a set of substrate blank check steps comprising:
      i) adding a substrate adapted to generate chemiluminescent light in reaction with ALP to that vessel;
      ii) incubating that vessel after the substrate adapted to generate chemiluminescent light in reaction with ALP is added to that vessel; and
      iii) using a luminometer comprised by the chemiluminescence detection subsystem, measuring chemiluminescent light from that vessel after it has been incubated and placed in a luminometer vessel chamber; and
   b) each vessel from the set of one or more vessels is empty when the substrate adapted to generate chemiluminescent light in reaction with ALP is added to it.

4. The method of claim 3, wherein the method comprises:
   a) determining that there is a fault in the laboratory instrument based on chemiluminescent light detected while performing the set of substrate blank check steps;
   b) extending evaluation of the chemiluminescence detection subsystem by performing a set of no-vessel light check steps comprising:
      i) measuring light detected in the luminometer vessel chamber by the luminometer when no vessel is present in the luminometer vessel chamber;
      ii) causing a light source comprised by the chemiluminescence detection subsystem to emit light at one or more intensities; and
      iii) for each of the one or more intensities, measuring light detected by the luminometer when the light source comprised by the chemiluminescence detection subsystem is emitting light at that intensity.

5. The method of claim 3, wherein the method comprises:
   a) determining that there is a fault in the laboratory instrument based on chemiluminescent light detected while performing the set of substrate blank check steps;
   b) extending evaluation of the chemiluminescence detection subsystem by performing a set of substrate volume check steps comprising:
      i) adding a predetermined volume of the substrate adapted to generate chemiluminescent light in reaction with ALP to a test vessel; and
      ii) measuring the actual volume of the substrate adapted to generate chemiluminescent light in reaction with ALP in the test vessel using one or more images of the test vessel captured with a digital camera.

6. The method of claim 2, wherein:
   a) evaluating the sample dispensing subsystem comprises performing a set of luminometer sample volume check steps comprising:
      i) for each of a set of one or more sample vessels:
         A) adding a predetermined amount of an ALP solution to that sample vessel using a reagent pipettor;
         B) moving a portion of the ALP solution from that sample vessel to a corresponding reaction vessel from a set of one or more reaction vessels using a sample pipettor comprised by the sample dispensing subsystem;
      ii) for each of the set of one or more reaction vessels corresponding to a sample vessel from the set of one or more sample vessels:
         A) adding a substrate adapted to generate chemiluminescent light in reaction with ALP to that reaction vessel;
         B) using a luminometer comprised by the chemiluminescence detection subsystem, measuring chemiluminescent light from that reaction vessel after it has been spun, incubated and placed in a luminometer vessel chamber;
   b) the method comprises:
      i) determining that there is a fault in the laboratory instrument based on chemiluminescent light detected while performing the set of luminometer sample volume check steps; and
      ii) addressing the fault by checking the sample pipettor position.

7. The method of claim 2, wherein:
   a) evaluating the sample dispensing subsystem comprises performing a set of luminometer sample volume check steps comprising:
      i) for each of a set of one or more sample vessels:
         A) adding a predetermined amount of an ALP solution to that sample vessel using a reagent pipettor;
         B) moving a portion of the ALP solution from that sample vessel to a corresponding reaction vessel from a set of one or more reaction vessels using a sample pipettor comprised by the sample dispensing subsystem;
      ii) for each of the set of one or more reaction vessels corresponding to a sample vessel from the set of one or more sample vessels:
         A) adding a substrate adapted to generate chemiluminescent light in reaction with ALP to that reaction vessel;
         B) using a luminometer comprised by the chemiluminescence detection subsystem, measuring chemiluminescent light from that reaction vessel after it has been spun, incubated and placed in a luminometer vessel chamber;

b) the method comprises:
  i) determining that there is a fault in the laboratory instrument based on chemiluminescent light detected while performing the set of luminometer sample volume check steps; and
  ii) extending evaluation of the sample dispensing subsystem by performing a set of camera sample volume check steps comprising:
    A) for each of a plurality of extended diagnostic sample vessels:
      I) dispensing a first volume of wash buffer into that extended diagnostic sample vessel using a reagent pipettor;
      II) aspirating a second volume of wash buffer from that extended diagnostic sample vessel using the sample pipettor; and
      III) capturing one or more digital camera images of that extended diagnostic sample vessel after aspiration of the second volume of wash buffer;
    B) for each of a first set of extended diagnostic reaction vessels:
      I) dispensing a third volume of wash buffer into that extended diagnostic reaction vessel using the sample pipettor; and
      II) capturing one or more digital camera images of that extended diagnostic reaction vessel after dispensing of the third volume of wash buffer;
    C) for each of a second set of extended diagnostic reaction vessels:
      I) dispensing a fourth volume of wash buffer into that extended diagnostic reaction vessel using the sample pipettor; and
      II) capturing one or more digital camera images of that extended diagnostic reaction vessel after dispensing of the fourth volume of wash buffer.

8. The method of claim 2, wherein:
a) evaluating the sample dispensing subsystem comprises performing a set of luminometer sample volume check steps comprising:
  i) for each of a set of one or more sample vessels:
    A) adding a predetermined amount of an ALP solution to that sample vessel using a reagent pipettor;
    B) moving a portion of the ALP solution from that sample vessel to a corresponding reaction vessel from a set of one or more reaction vessels using a sample pipettor comprised by the sample dispensing subsystem;
  ii) for each of the set of one or more reaction vessels corresponding to a sample vessel from the set of one or more sample vessels:
    A) adding a substrate adapted to generate chemiluminescent light in reaction with ALP to that reaction vessel;
    B) using a luminometer comprised by the chemiluminescence detection subsystem, measuring chemiluminescent light from that reaction vessel after it has been spun, incubated and placed in a luminometer vessel chamber;
b) the method comprises:
  i) determining that there is a fault in the laboratory instrument based on chemiluminescent light detected while performing the set of luminometer sample volume check steps; and
  ii) extending evaluation of the sample dispensing subsystem by performing a set of sample volume linearity check steps comprising:
    A) for each of a set of one or more test sample vessels:
      I) adding a predetermined amount of an ALP solution to that test sample vessel using a reagent pipettor;
      II) moving a portion of the ALP solution from that test sample vessel to a corresponding test reaction vessel from a set of one or more test reaction vessels using the sample pipettor, wherein the portion of the ALP solution moved from that test sample vessel has an amount corresponding to a subset of the set of test reaction vessels which the test reaction vessel into which the portion of ALP solution is moved;
    B) for each of the set of one or more test reaction vessels corresponding to a test sample vessel from the set of one or more test sample vessels:
      I) adding the substrate adapted to generate chemiluminescent light in reaction with ALP to that reaction vessel; and
      II) using the luminometer comprised by the chemiluminescence detection subsystem, measuring chemiluminescent light from that reaction vessel after it has been spun, incubated and placed in a luminometer vessel chamber.

9. The method of claim 2, wherein:
a) evaluating the sample dispensing subsystem comprises performing a set of luminometer sample volume check steps comprising:
  i) for each of a set of one or more sample vessels:
    A) adding a predetermined amount of an ALP solution to that sample vessel using a reagent pipettor;
    B) moving a portion of the ALP solution from that sample vessel to a corresponding reaction vessel from a set of one or more reaction vessels using a sample pipettor comprised by the sample dispensing subsystem;
  ii) for each of the set of one or more reaction vessels corresponding to a sample vessel from the set of one or more sample vessels:
    A) adding a substrate adapted to generate chemiluminescent light in reaction with ALP to that reaction vessel;
    B) using a luminometer comprised by the chemiluminescence detection subsystem, measuring chemiluminescent light from that reaction vessel after it has been spun, incubated and placed in a luminometer vessel chamber;
b) the method comprises:
  i) determining that there is a fault in the laboratory instrument based on chemiluminescent light detected while performing the set of luminometer sample volume check steps; and
  ii) extending evaluation of the sample dispensing subsystem by performing a set of sample dilution check steps comprising:
    A) adding a predetermined volume of an ALP solution to each of a plurality of test sample vessels using the reagent pipettor;
    B) for each of a first set of test dilution vessels:
      I) moving a first amount of the ALP solution from a corresponding test sample vessel to that test dilution vessel using the sample pipettor;

II) adding a second amount of wash buffer to that test dilution vessel using the reagent pipettor;
III) mixing the contents of that test dilution vessel;
IV) move a third amount of fluid from that dilution vessel to a corresponding reaction vessel using the sample pipettor;
C) for each of a second set of test dilution vessels:
I) moving a fourth amount of the ALP solution from a corresponding test sample vessel to that test dilution vessel using the sample pipettor;
II) adding a fifth amount of wash buffer to that test dilution vessel using a reagent pipettor;
III) mixing the contents of that test dilution vessel;
IV) move the third amount of fluid from that dilution vessel to a corresponding reaction vessel using the sample pipettor;
D) adding, to each of the test reaction vessels that corresponds to a test dilution vessel, the substrate adapted to generate chemiluminescent light in reaction with ALP; and
E) using a luminometer comprised by the chemiluminescence detection subsystem, measuring chemiluminescent light from that test reaction vessel after it has been spun, incubated and placed in a luminometer vessel chamber.

10. The method of claim 2, wherein:
a) evaluating the sample dispensing subsystem comprises performing a set of luminometer sample volume check steps comprising:
i) for each of a set of one or more sample vessels:
A) adding a predetermined amount of an ALP solution to that sample vessel using a reagent pipettor;
B) moving a portion of the ALP solution from that sample vessel to a corresponding reaction vessel from a set of one or more reaction vessels using a sample pipettor comprised by the sample dispensing subsystem;
ii) for each of the set of one or more reaction vessels corresponding to a sample vessel from the set of one or more sample vessels:
A) adding a substrate adapted to generate chemiluminescent light in reaction with ALP to that reaction vessel;
B) using a luminometer comprised by the chemiluminescence detection subsystem, measuring chemiluminescent light from that reaction vessel after it has been spun, incubated and placed in a luminometer vessel chamber;
b) the sample pipettor is selected from a set of sample pipettors consisting of:
i) a sample precision pipettor; and
ii) a sample aliquot pipettor.

11. The method of claim 2, wherein:
a) the set of subsystems comprises a assay washing subsystem;
b) the analytic sequence of steps comprises using the assay washing subsystem to remove unbound material from the reaction vessel between using the sample dispensing subsystem to dispense the biological fluid into the reaction vessel and using the chemiluminescence detection subsystem to detect chemiluminescent light from the reaction vessel; and
c) the set of diagnostic steps comprises evaluating operation of the assay washing subsystem between evaluating operation of the sample dispensing subsystem and evaluating operation of the chemiluminescence detection subsystem.

12. The method of claim 11, wherein:
a) the instrument comprises a reagent dispensing subsystem;
b) the analytic sequence of steps comprises using the reagent dispensing subsystem to dispense a reagent into the reaction vessel before using the assay washing subsystem to remove unbound material from the reaction vessel;
c) the set of diagnostic steps comprises evaluating operation of the reagent dispensing subsystem before evaluating operation of the assay washing subsystem;
d) evaluating operation of the reagent dispensing subsystem before evaluating operation of the assay washing subsystem comprises evaluating operation of the reagent dispensing subsystem using a digital camera; and
e) the set of diagnostic steps comprises evaluating operation of the reagent dispensing subsystem using a luminometer comprised by the luminescence detection subsystem after evaluating operation of the assay washing subsystem.

13. The method of claim 12, wherein:
a) evaluating operation of the reagent dispensing subsystem using a digital camera comprises:
i) ultrasonically mixing a diagnostic reagent in a diagnostic reagent pack using an ultrasonic probe;
ii) for each vessel in a set of vessels, using the reagent pipettor to transfer the diagnostic reagent from the diagnostic reagent pack to that vessel;
iii) using the digital camera to capture one or more reagent resuspension images, wherein each of the one or more reagent resuspension images comprises an image of a vessel from the set of vessels after the diagnostic reagent has been added to that vessel;
iv) performing a reagent resuspension check using the one or more reagent resuspension images;
b) the reagent dispensed into the reaction vessel before using the assay washing subsystem to remove unbound material from the reaction vessel comprises paramagnetic particles and an antibody component adapted by bind to an analyte; and
c) the diagnostic reagent comprises paramagnetic particles and does not include an antibody component.

14. The method of claim 12 wherein evaluating operation of the reagent dispensing subsystem using the luminometer comprises, for each of a set of one or more vessels, performing a set of luminometer reagent volume check steps comprising:
a) adding a predetermined volume of an ALP solution to that vessel using a reagent pipettor;
b) adding a substrate adapted to generate chemiluminescent light in reaction with ALP to that vessel;
c) using the luminometer comprised by the chemiluminescence detection subsystem, measuring chemiluminescent light from that vessel after it has been, spun, incubated and placed in a luminometer vessel chamber.

15. The method of claim 14, wherein the method comprises:
a) determining that there is a fault in the laboratory instrument based on chemiluminescent light detected while performing the set of luminometer reagent volume check steps; and
b) addressing the fault by realigning a position of the reagent pipettor.

16. The method of claim 14, wherein the method comprises:

a) determining that there is a fault in the laboratory instrument based on chemiluminescent light detected while performing the set of luminometer reagent volume check steps; and
b) extending evaluation of the reagent dispensing subsystem by, for each of a plurality of test vessels, perform a set of camera reagent volume check steps comprising:
   i) adding a predetermined volume of wash buffer to that test vessel using the reagent pipettor; and
   ii) capturing one or more images of that test vessel.

17. The method of claim 14, wherein
a) the method comprises:
   i) determining that there is a fault in the laboratory instrument based on chemiluminescent light detected while performing the set of luminometer reagent volume check steps; and
   ii) extending evaluation of the reagent dispensing subsystem by, for each of a plurality of test vessels, performing a set of reagent volume linearity check steps comprising:
      A) adding a predetermined volume of a mixture of ALP solution and wash buffer to that test vessel;
      B) adding the substrate adapted to generate chemiluminescent light in reaction with ALP to that test vessel; and
      C) using a luminometer comprised by the chemiluminescence detection subsystem, measuring chemiluminescent light from that vessel after it has been, spun, incubated and placed in a luminometer vessel chamber
b) the plurality of test vessels comprises three subsets of test vessels; and
c) for each of the three subsets of test vessels comprised by the plurality of test vessels, the mixture of ALP solution and wash buffer added to test vessels comprised by that subset of test vessels has a different ratio of ALP solution to wash buffer than the mixtures of ALP solution and wash buffer added to test vessels comprised by the other subsets comprised by the plurality of test vessels.

* * * * *